United States Patent
Shimada et al.

(10) Patent No.: US 9,628,825 B2
(45) Date of Patent: Apr. 18, 2017

(54) VIDEO DECODER, VIDEO ENCODER, VIDEO DECODING METHOD, AND VIDEO ENCODING METHOD

(71) Applicant: FUJITSU LIMITED, Kawasaki-shi, Kanagawa (JP)

(72) Inventors: Satoshi Shimada, Kawasaki (JP); Kimihiko Kazui, Kawasaki (JP); Junpei Koyama, Shibuya (JP); Akira Nakagawa, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 145 days.

(21) Appl. No.: 14/372,851

(22) PCT Filed: Jan. 16, 2013

(86) PCT No.: PCT/JP2013/051225
§ 371 (c)(1),
(2) Date: Jul. 17, 2014

(87) PCT Pub. No.: WO2013/108922
PCT Pub. Date: Jul. 25, 2013

(65) Prior Publication Data
US 2015/0049804 A1    Feb. 19, 2015

(30) Foreign Application Priority Data
Jan. 20, 2012    (JP) .................. 2012-010465

(51) Int. Cl.
*H04N 7/12* (2006.01)
*H04N 11/02* (2006.01)
(Continued)

(52) U.S. Cl.
CPC ........... *H04N 19/91* (2014.11); *H04N 19/124* (2014.11); *H04N 19/436* (2014.11); *H04N 19/44* (2014.11);
(Continued)

(58) Field of Classification Search
CPC ...................................................... H04N 7/50
See application file for complete search history.

(56) References Cited

U.S. PATENT DOCUMENTS

2010/0142835 A1    6/2010    Nakagami et al.
2010/0322317 A1*  12/2010    Yoshimatsu ........... H04N 19/70
                                                                 375/240.24
(Continued)

FOREIGN PATENT DOCUMENTS

GB    2 290 985 A1    3/2011
GB    2 357 825 A1    8/2011
(Continued)

OTHER PUBLICATIONS

Korean Office Action dated Aug. 24, 2015 in corresponding Korean Patent Application No. 10-2014-7020171.
(Continued)

*Primary Examiner* — Chikaodili E Anyikire
(74) *Attorney, Agent, or Firm* — Staas & Halsey LLP

(57) ABSTRACT

A video decoder decoding an encoded stream includes a parallel entropy decoding part to entropy decode the stream of blocks in block lines in parallel, a parallel QP prediction part to compute prediction values of the blocks in the block lines in parallel, and a parallel decoding processing part to generate decoded pixels of the blocks in the block lines in parallel, the decoded pixel being obtained utilizing data decoded by the parallel entropy decoding part and the prediction value. When performing computing processing in parallel per unit of N block lines, the processing is performed on a processing block in a (K−1)th block line preceding a processing block in a Kth block line by at least one block in a horizontal position to compute the prediction value of the processing block by referring to a block already processed corresponding to the processing block.

3 Claims, 21 Drawing Sheets

(51) Int. Cl.

| | | |
|---|---|---|
| *H04N 11/04* | (2006.01) | |
| *H04N 19/91* | (2014.01) | |
| *H04N 19/593* | (2014.01) | |
| *H04N 19/463* | (2014.01) | |
| *H04N 19/124* | (2014.01) | |
| *H04N 19/44* | (2014.01) | |
| *H04N 19/436* | (2014.01) | |
| *H04N 19/50* | (2014.01) | |
| *H04N 19/60* | (2014.01) | |
| *H04N 19/129* | (2014.01) | |
| *H04N 19/156* | (2014.01) | |
| *H04N 19/174* | (2014.01) | |

(52) U.S. Cl.
CPC ........... *H04N 19/463* (2014.11); *H04N 19/50* (2014.11); *H04N 19/593* (2014.11); *H04N 19/60* (2014.11); *H04N 19/129* (2014.11); *H04N 19/156* (2014.11); *H04N 19/174* (2014.11)

(56) References Cited

U.S. PATENT DOCUMENTS

| | | | | |
|---|---|---|---|---|
| 2011/0150077 | A1* | 6/2011 | Kishore | H04N 19/176 375/240.03 |
| 2011/0176606 | A1* | 7/2011 | Fuchie | H04N 19/176 375/240.05 |
| 2011/0200115 | A1* | 8/2011 | Hayashi | H04N 19/176 375/240.24 |
| 2013/0089266 | A1* | 4/2013 | Yang | H04N 19/50 382/238 |
| 2013/0156110 | A1 | 6/2013 | Nakagami et al. | |
| 2014/0079137 | A1 | 3/2014 | Nakagami et al. | |
| 2014/0334538 | A1 | 11/2014 | Okawa | |
| 2015/0078439 | A1 | 3/2015 | Nakagami et al. | |
| 2016/0309194 | A1 | 10/2016 | Nakagami et al. | |

FOREIGN PATENT DOCUMENTS

| | | |
|---|---|---|
| JP | 2013-123206 | 6/2013 |
| WO | 2007/013437 | 2/2007 |
| WO | WO 2009/150808 A1 | 12/2009 |
| WO | WO 2010/067505 A1 | 6/2010 |

OTHER PUBLICATIONS

Muhammed Coban, et al., CE4: Subtest 1: Spatial QP prediction (test 1.3.e), combination of test 1.3.b and test 1.3.d, Joint Collaborative Team on Video Coding (JCT-VC) of ITU-T SG16 WP3 and ISO/IEC JTC1/SC29/W G11 7$^{th}$ Meeting: Geneva, CH, Nov. 15, 2011, [JCTVC-G728], pp. 1-8.

Japanese Office Action mailed May 26, 2015 in Appln. No. 2012-010465.

"Test Model 5", document AVC-491b of *Experts Group for ATM Video Coding (Rapporteur's Group on Part of Q.2/15) ISO/IEC JTC1/SC29/WG11/N0400*, Apr. 7, 1993, pp. 1-119, Test Model Editing Committee.

"Series H: Audiovisual and Multimedia Systems Infrastructure of audiovisual services—Coding of moving video Advanced video coding for generic audiovisual services", *ISO/IEC 14496-10 (MPEG-4 Part 10) / ITU-T Rec.H.264*, 2010, 676 pp., International Telecommunication Union.

Gary J. Sullivan, "Next-Generation High Efficiency Video Coding (HEVC) Standard", PowerPoint presentation for *Hollywood Post Alliance (HPA) Technology Retreat / ATSC Next Generation Broadcast Television Symposium*, Feb. 15, 2011, 15 pp., Microsoft, https://hevc.hhi.fraunhofer.de/svn/svn_HEVCSoftware/tags/HM-5.0/.

Gordon Clare, et al., "Wavefront Parallel Processing for HEVC Encoding and Decoding", document JCTVC-F274 of *ITU-T SG16 WP3 and ISO/IEC JTC1/SC29/1/VG11 6th Meeting*, Jul. 14-22, 2011, pp. 1-16, Orange Labs, Torino Italy, HTTP://WFTP3.ITU.INT/AV-ARCH/JCTVC-SITE/,no.JCTVC-F274.

Kenji Kondo, et al., "Improvement of delta-QP Coding", document JCTVC-F422r1 of *ITU-T SG16 WP3 and ISO/IEC JTC1/SC29/WG11 6th Meeting*, Jul. 14-22, 2011, pp. 1-9, Sony Corp. and Sony Electronics Inc., Torino, Italy.

Benjamin Bross, et al., "Working Draft 5 of High-Efficiency Video Coding", document JCTVC-G1103_d3 of *ITU-T SG16 WP3 and ISO/IEC JTC1/SC29/WG11 7th Meeting*, Nov. 21-30, 2011, 215 pp., Editor, Geneva, Switzerland.

Satoshi Shimada, et al., "On derivation of luma QP predictor for Wavefront Parallel Processing", document JCTVC-H0226 of *ITU-T SG16 WP3 and ISO/IEC JTC1/SC29/WG11 8th Meeting*, Feb. 1-10, 2012, pp. 1-3, Fujitsu Laboratories Ltd., San Jose, California, USA.

Michael Horowitz, "JCT-VC BoG report: tiles and wavefront parallel processing", document JCTVC-H0727 of *ITU-T SG16 WP3 and ISO/IEC JTC1/SC29/WG11 8th Meeting*, Feb. 1-10, 2012, pp. 1-9, eBrisk Video, Inc., San Jose, California, USA.

International Search Report mailed May 30, 2014, in corresponding International Patent Application No. PCT/JP2013/051225.

Mexican Office Action dated Sep. 3, 2015 in corresponding Mexican Patent Application No. MX/a/2014/008778.

Patent Abstracts of Japan, Publication No. 2013-123206, published Jun. 20, 2013.

Japanese Office Action dated May 10, 2016 in corresponding Japanese Patent Application No. 2012-010465.

Mexican Office Action dated Oct. 17, 2016 in corresponding Mexican Patent Application No. MX/a/2015/017523.

Office Action for corresponding Chinese Patent Application No. 201380005990.1, issued Nov. 4, 2016.

Espacenet English Language Abstract for WO 2017/013437, published on Feb. 1, 2007.

Office Action for Japanese Patent Application No. 2015-219838, issued Feb. 10, 2017.

Office Action for Japanese Patent Application No. 2015-219839, issued Feb. 10, 2017.

Espacenet English Language Abstract for WO 2007/013437, published on Feb. 1, 2007.

Office Action for Japanese Patent Application No. 2015-219838, issued Feb. 21, 2017.

Office Action for Japanese Patent Application No. 2015-219839, issued Feb. 21, 2017.

\* cited by examiner

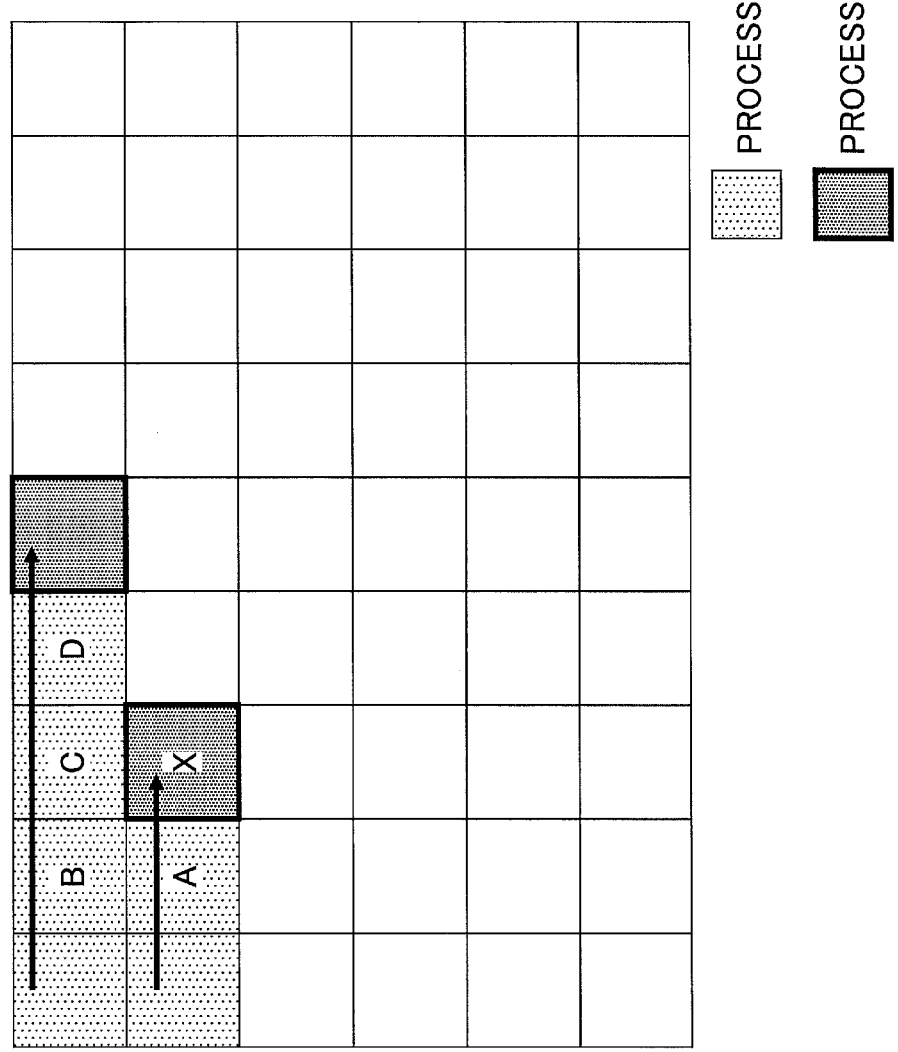

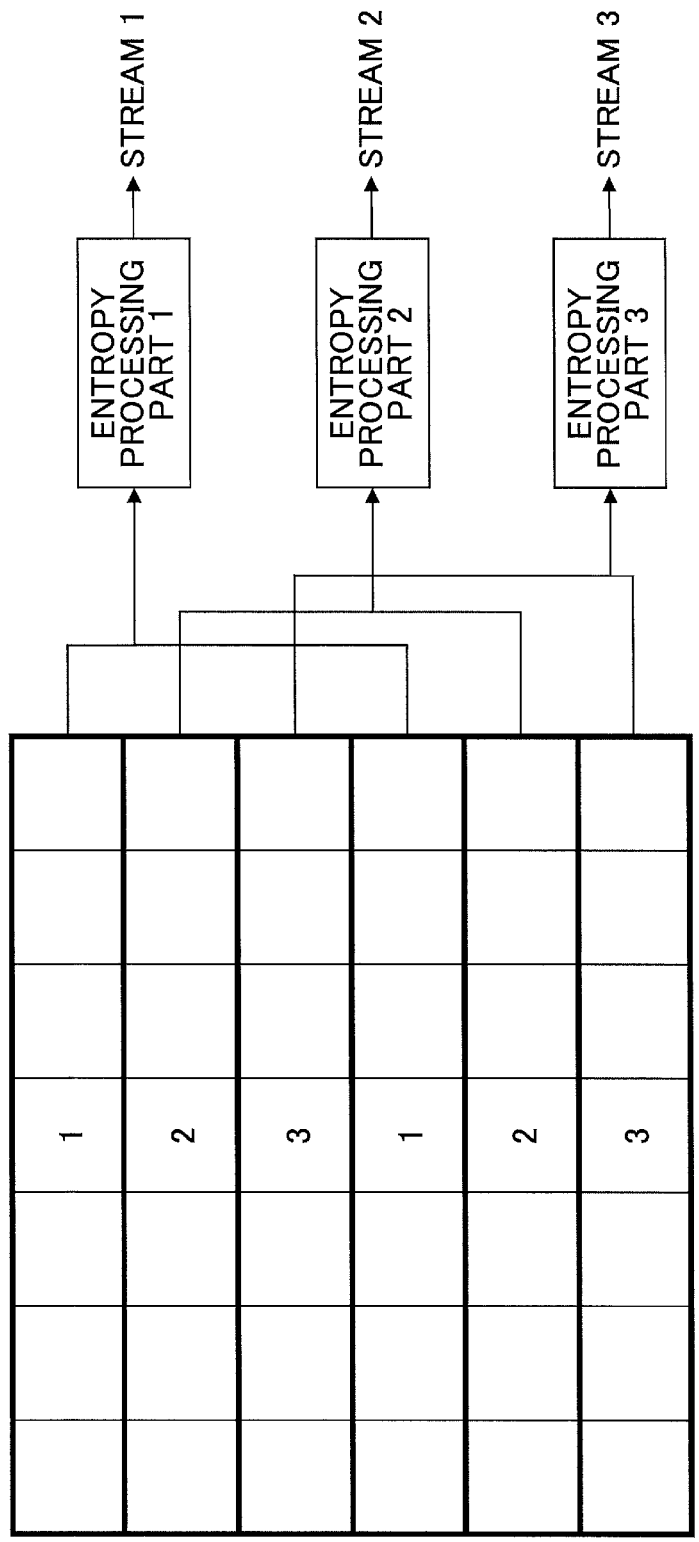

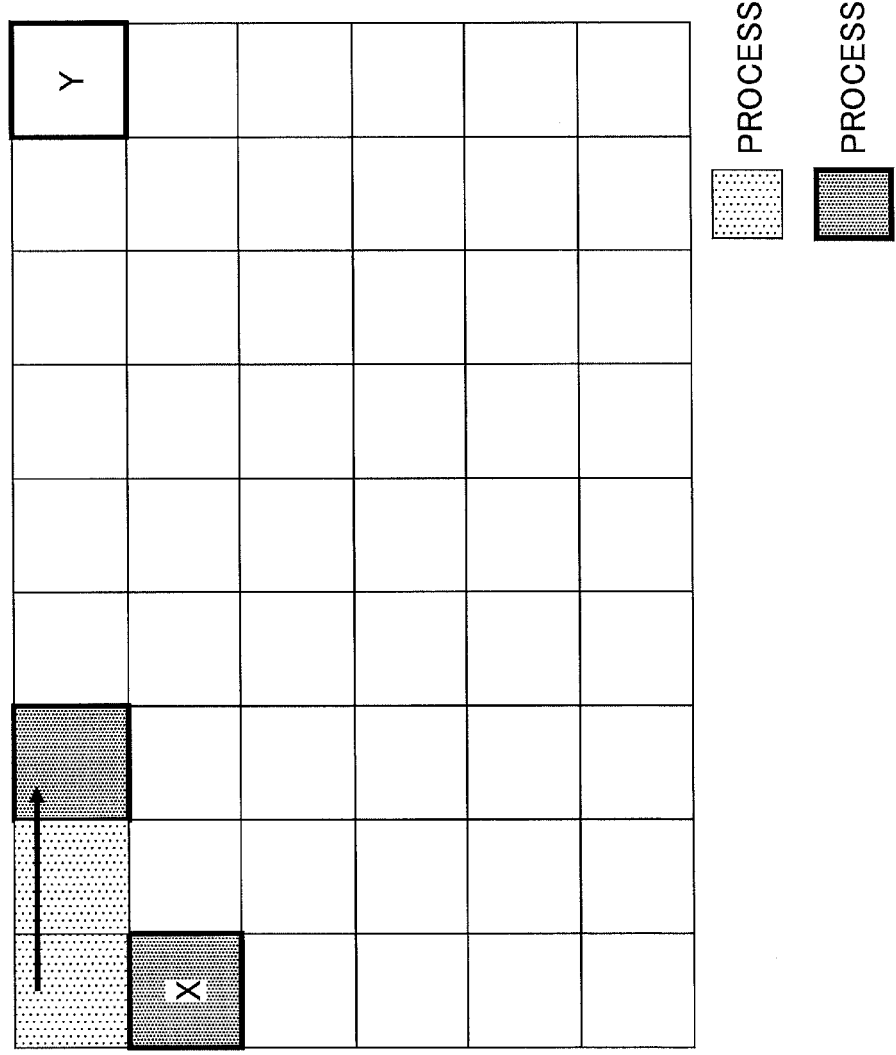

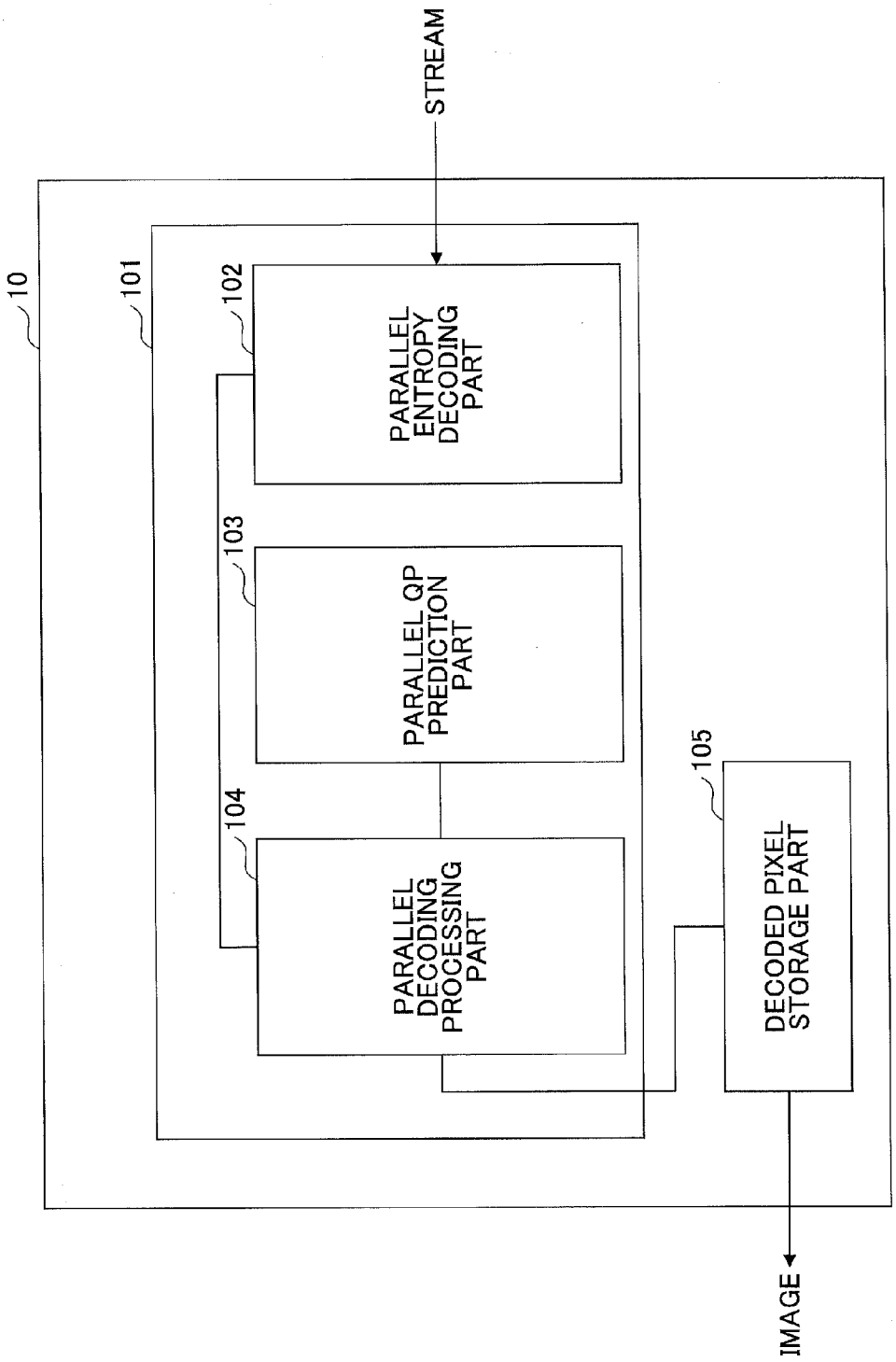

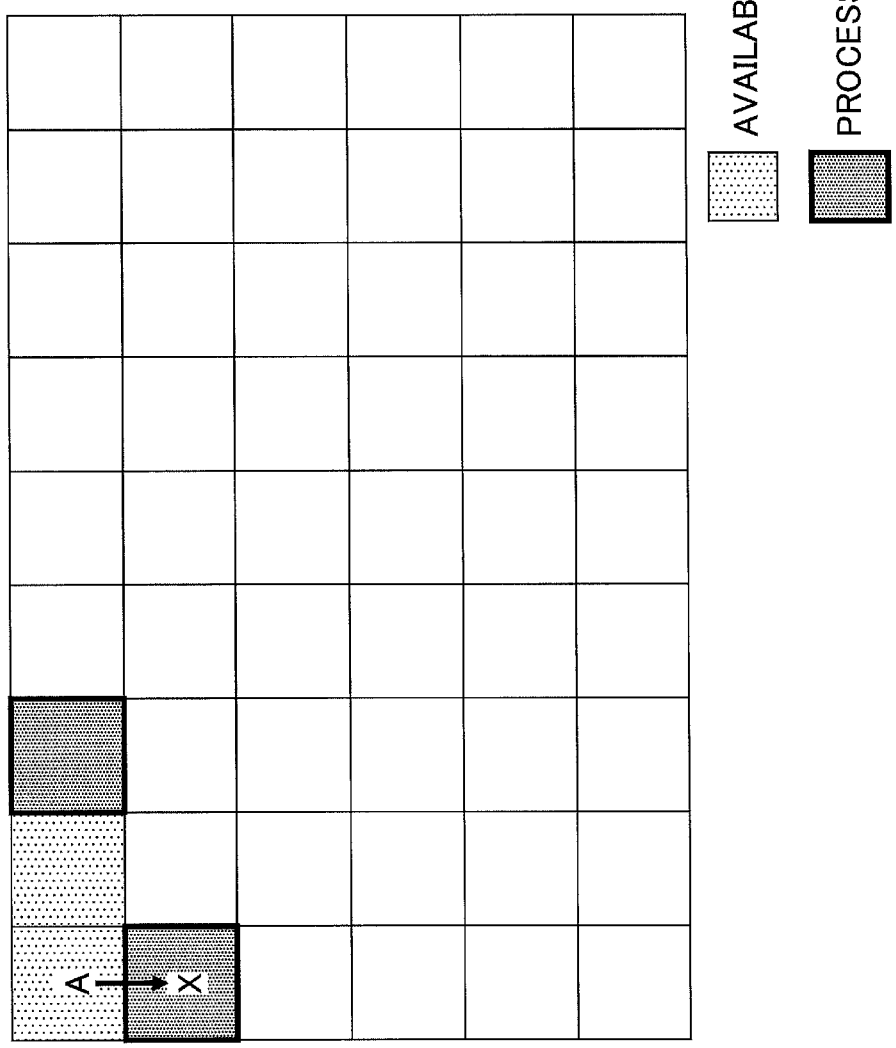

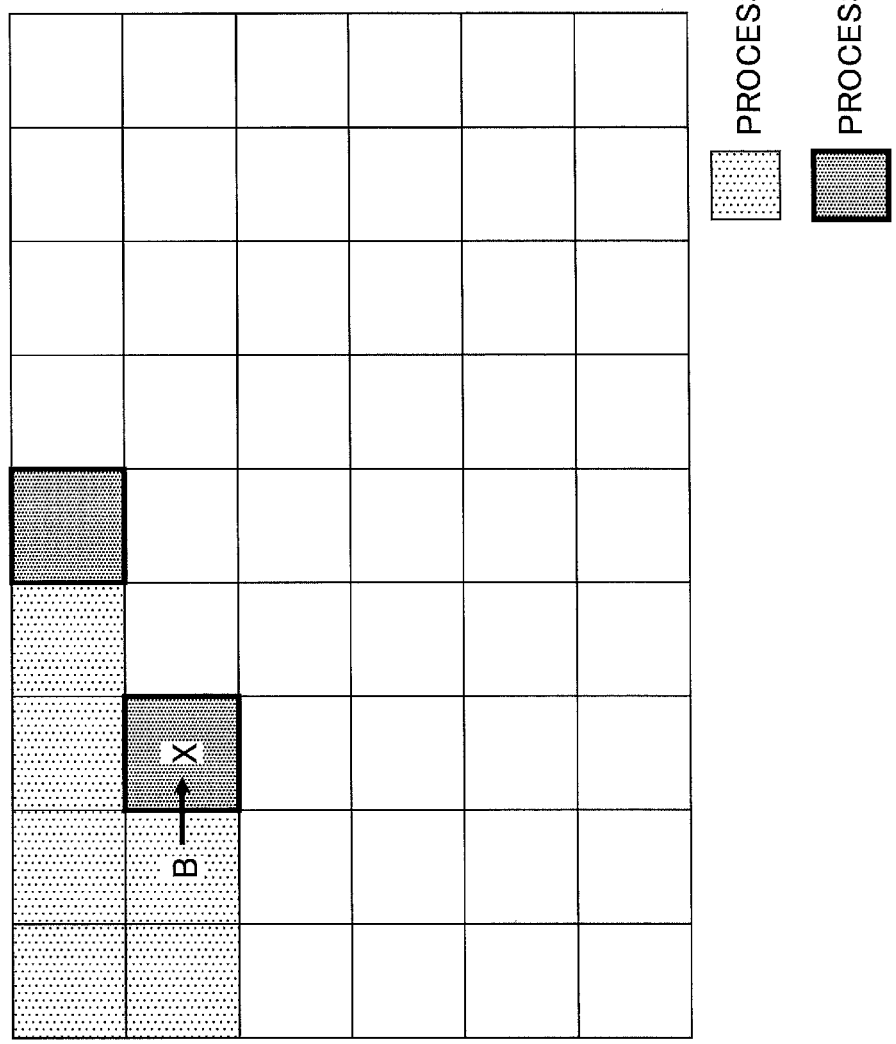

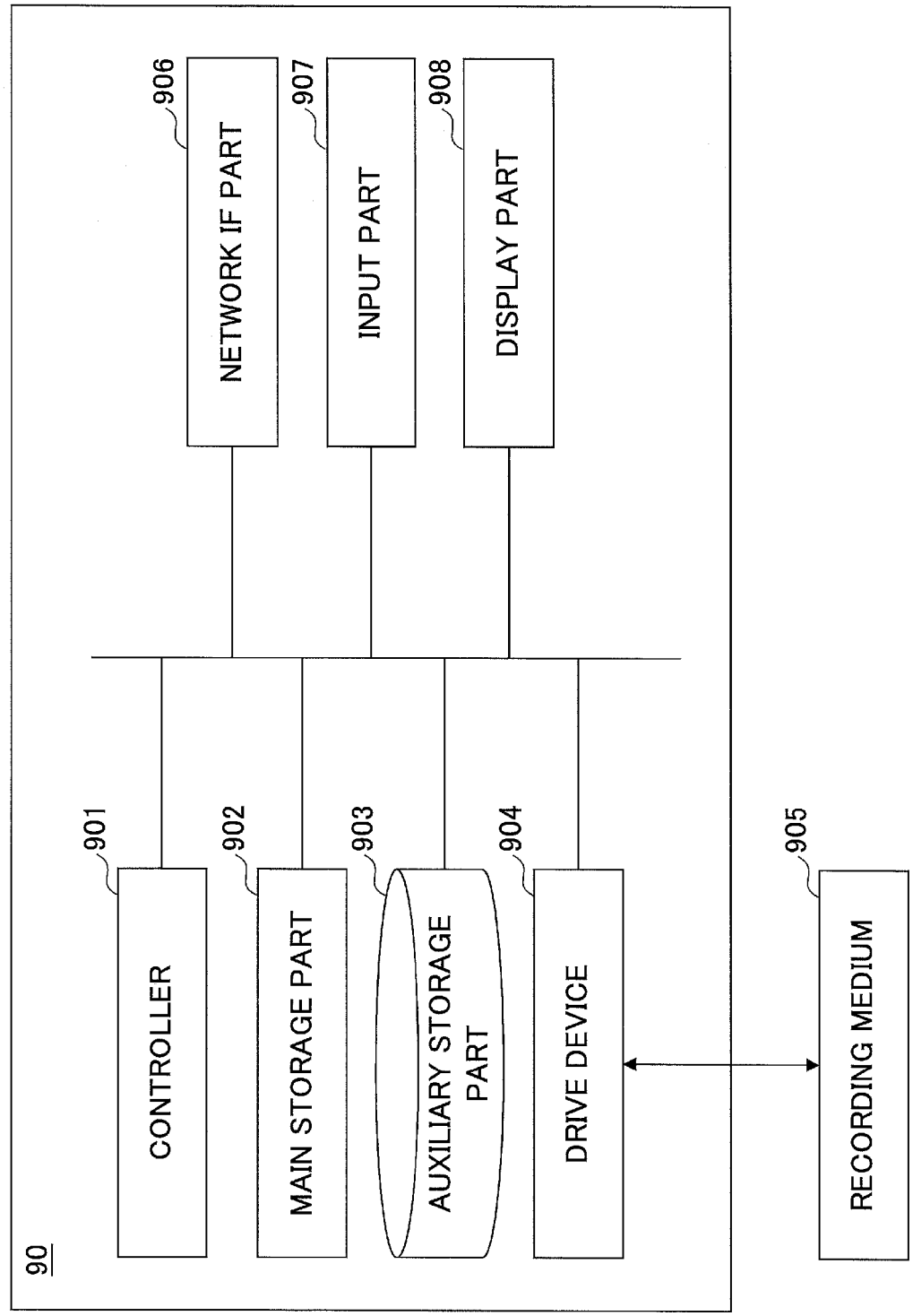

VIDEO DECODER, VIDEO ENCODER, VIDEO DECODING METHOD, AND VIDEO ENCODING METHOD

CROSS REFERENCE TO RELATED APPLICATIONS

This application is a U.S. national stage application of PCT/JP2013/051225, filed Jan. 16, 2013, and claims foreign priority benefit of Japanese Application No. 2012-010465, filed Jan. 20, 2012, in the Japanese Intellectual Property Office, the contents of which are incorporated herein by reference.

TECHNICAL FIELD

The embodiments discussed herein relate to a video decoder, a video encoder, a video decoding method, and a video encoding method.

BACKGROUND ART

A recent video encoding technology involves dividing an image into blocks, predicting pixels contained in each of the blocks, and encoding the prediction differentials to achieve a high compression ratio. In this technology, a prediction mode for forming prediction pixels from the pixels within a picture subjected to encoding is referred to as "intra-prediction", and a prediction mode for forming prediction pixels from a previously encoded reference image called "motion compensation" is referred to as "inter-prediction".

In the video encoder, the inter-prediction expresses a region referred to as the predicted pixels with a motion vector composed of two-dimensional coordinate data including a horizontal component and a vertical component, and encodes prediction differential data of the motion vector and the pixels. In order to suppress an encoding amount of the motion vector, a prediction vector is generated from a motion vector of a block adjacent to the block subjected to encoding, and the differential vector between the motion vector and the prediction vector is encoded.

In Moving Picture Experts Group (MPEG)-4 AVC/H.264 (hereinafter also called "H.264"), which is a current provisioning video coding standard typically represented by High Efficiency Video Coding (HEVC), an address is assigned to each of the divided blocks in a raster order, and the processing order of the blocks is complied with the address order.

In the video encoding-decoding process, a large number of pixels is generally processed per second. In particular, motion compensation or orthogonal transformation may require high computational performance, and hence, it may be preferable that the video encoding or decoding process implement parallel processing. In the video encoding, there is a dependence relationship between the blocks for computing various prediction values from a block peripheral to the block subjected to encoding in a manner similar to the computation of the prediction vectors as described above. Hence, it may be difficult to perform parallel processing on the blocks.

A method for implementing parallel processing on the blocks without affecting the processing order or the dependence relationship between the blocks may, for example, include performing parallel processing by shifting a horizontal position of each of the processing blocks corresponding to the block lines.

In the following description, such parallel processing is called "parallel block line processing". Next, a case where the parallel block line processing is performed corresponding to two block lines is described.

In order to perform parallel block line processing, a video processing device includes a unit 1 and a unit 2 each configured to independently process the corresponding block lines. For example, the unit 1 may be configured to process odd-numbered block lines, and the unit 2 may be configured to process even-numbered block lines.

FIG. 1 is a diagram illustrating an example of parallel block line processing. As illustrated in FIG. 1, a horizontal address of a block in a first block line processed by the unit 1 are shifted by two or more blocks from a horizontal address of a block in a second block line processed by the unit 2.

Thus, when a processing block X processed by the unit 2 is focused on, a block A on the left side of the processing block X is a processed block on which processing has been already performed. Similarly, a block B, a block C, and a block D processed by the unit 1 are processed blocks. The block B is on the upper left side of the processing block X, the block C is above the processing block X, and the block D is on the upper right side of the processing block X. The block X may be able to utilize encoded results of these processed blocks.

For example, processing on the even-numbered block lines may be able to start without awaiting the end of the processing on the odd-numbered block lines, and hence, the processing block X may be able to implement parallel processing associated with processing such as motion prediction or orthogonal transformation. In the above example, parallel processing of two block lines is described; however, the implementation of parallel processing is not limited to the parallel processing of the two block lines. In a case of parallel processing of N block lines, N units may be assigned to the N block lines in the video processing device.

Note that when parallel block line processing is executed as a program, a processing unit may be a thread, or a central processing unit (CPU).

According to H.264, entropy encoding may be carried out by processing a series of output bits in the order of processing blocks based on the standard specification. Hence, the video processing device temporarily stores results of the aforementioned parallel block line processing, and an entropy-encoder encodes the stored results in the order of processing blocks based on the standard specification.

By contrast, HEVC discloses a technology for interleafing a series of output bits between the block lines. FIG. 2 is a diagram illustrating an example of parallel block line processing performed by an entropy processing part in HEVC. As illustrated in FIG. 2, entropy encoding or decoding may be performed by parallel processing between the block lines.

RELATED ART DOCUMENT

Non-Patent Document 1: ISO/IEC 14496-10 (MPEG-4 Part 10)/ITU-T Rec.H.264
Non-Patent Document 2: Thomas Wiegand, Woo-Jin Han, Benjamin Bross, Jens-Rainer Ohm, Gary J. Sullivan, "Working Draft 5 of High-Efficiency Video Coding" JCTVC-G1103, JCT-VC 7th Meeting, December, 2011.
Non-Patent Document 3: HEVC reference software HM 5.0 https://hevc.hhi.fraunhofer.de/svn/svn_HEVCSoftware/tags/HM-5.0/

Non-Patent Document 4: MPEG-2, Test Model 5 (TM 5), Doc. ISO/IEC JTC1/SC29/WG11/N0400, Test Model Editing Committee, April 1993.

In a hybrid encoding system, which is a combination of motion compensation and orthogonal transformation (e.g., discrete cosine transform (DCT)) represented by H.264 or HEVC, the compression is implemented by dividing an image into blocks, generating prediction pixels of the blocks, and performing orthogonal transformation such as DCT on the differential pixels between the original pixels and the prediction pixels to quantize output coefficients of the orthogonal transformation.

In this hybrid system, a quantization parameter (QP) to regulate the accuracy of the quantization is prepared, and the QP value is encoded for each of the blocks so as to control an amount of output-bitstream.

However, in a case where all the quantized transform-coefficients in the blocks are 0, the results of inverse quantization are all 0. Hence, the QP value may not be required for decoding processing. In such a case, the QP value is invalidated, and is not encoded as a result.

A prediction value of the QP value (hereinafter called a "QP prediction value") is generated in in each of the blocks. Hence, when the QP values of the processing blocks are invalidated, the QP value of each of the blocks is set as the QP prediction value. As a method for determining the QP value for each of the blocks, the algorithm utilized in TM 5 disclosed in Non-Patent Document 4 may be known in the art.

A method for encoding the QP value according to H.264 or HEVC includes encoding the differential value QP_DELTA between the QP value and the QP prediction value of the processing block. For example, the QP prediction value may be a QP value QP_prev, which is the QP value of an immediately preceding block of the processing block in the raster order. The QP_DELTA may be computed by the following formula (1).

$$QP\_DELTA = QP - QP\_prev \quad (1)$$

The video decoder is configured to decode the QP_DELTA entropy encoded by the video encoder to restore the QP value by the following formula (2).

$$QP = QP\_DELTA + QP\_prev \quad (2)$$

When there is no block immediately preceding the processing block such as the first block of the processing picture, the QP_prev may be a value determined in advance of the processing of the first block. For example, according to H.264, the QP_prev of the first block of the picture is assigned with a Slice QP value described in header information called "Slice".

Further, according to H.264 or HEVC, the QP value of each of the blocks may be utilized for determining the filter strength of a deblocking filter other than the quantization of the orthogonal transformation. The invalidated QP is not reported to the video decoder. Hence, the QP value of the block having the invalidated QP may be processed as the QP_prev.

Here, a (K−1)th block line and a Kth block line in the parallel block line processing are focused on. When a first block X in the Kth block line is processed at the time of starting processing of the Kth block line, approximately two blocks in the Kth block line have been processed in advance of (K−1)th block line. A block preceding the first block of the Kth block line corresponds to a last block of the (K−1)th block line. Accordingly, the processing of the block Y is yet to be completed at the time of starting processing of the Kth block line.

Hence, when the block X is processed, a QP_prev is not determined. Since the QP_prev of the block X is not determined, a QP_prev of a block subsequent to the block X is not determined.

Accordingly, the QP prediction values are not computed in parallel between the block lines but are computed sequentially. FIGS. 3A and 3B are block diagrams each illustrating a schematic configuration of a related-art video processing device performing related-art parallel block line processing.

More specifically, FIG. 3A is a block diagram illustrating a schematic configuration of a related-art encoder performing parallel block line processing. FIG. 3B is a block diagram illustrating a schematic configuration of a related-art decoder performing parallel block line processing.

As illustrated in FIGS. 3A and 3B, in the related-art video processing device, a QP prediction part configured to compute the QP prediction values may be a bottleneck.

FIG. 4A is a diagram illustrating an example of parallel block line processing in QP prediction processing. In the example illustrated in FIG. 4A, the first block line and the second block line are processed in parallel. In this case, when X represents the processing block of the second block line, the computation of a QP prediction value of the block X may need to wait until the processing of the block Y is completed. That is, processing of the second block line is not initiated unless the processing of the first block line is completed.

FIG. 4B is a diagram illustrating another example of parallel block line processing in the QP prediction processing. As illustrated in FIG. 4B, when the processing of the block Y has been completed, the processing of the second block line is initiated.

FIG. 4C is a diagram illustrating still another example of parallel block line processing in the QP prediction processing. In the example illustrated in FIG. 4C, the QP prediction part that has been processing the first block line may need to wait until processing of a block V is completed in order to compute a QP value of a block W in a third block line.

That is, processing of the third block line is not initiated unless the processing of the second block line is completed. Thus, the processing of the (K−1)th block line may need to be completed for initiating the Kth block line, and consequently, the QP values may be computed in series in the related art technology.

When the encoding processing is performed in parallel, and the QP prediction parts are processed in series, the following points may need to be considered. For example, since the QP_prev of the block X is not determined, the QP_DELTA is not computed at the first block of the Kth block line, and the entropy processing of the block X is not initiated until the processing of the block Y is completed.

Accordingly, since the initiation of the entropy processing is delayed, the buffer size for storing the results generated by the encoding processing part may be increased. Further, processing of a deblocking filter is not initiated.

Similarly, parallel block line processing in a video decoder may be considered below. According to HEVC, the entropy processing may be performed in parallel between the block lines. Similar to the first example, the (K−1)th block line and the Kth block line are focused on, and the QP restoration processing of the first block X of the Kth block line are considered. In this case, the QP_DELTA of the block Y is yet to be decoded at the time where the QP_DELTA of the block X is decoded, and hence, the QP value of the block Y will not be restored.

Since the QP prediction value QP_prev of the block X corresponds to the QP value of the block Y, the QP_prev of the block X will not be computed. As a result, the QP value of the block X will not be restored. Accordingly, the QP prediction values of the respective blocks may be performed in series, which may result in the bottleneck in the parallel processing in a manner similar to the video encoder.

SUMMARY OF THE INVENTION

Accordingly, the technology disclosed below may enable the computational processing of the QP prediction values to implement parallel processing, which may improve the efficiency of the parallel block line processing.

According to an aspect of the embodiments, there is provided a video decoder for decoding a stream encoded with a video encoding system, in which the encoded stream is obtained by encoding an image of a plurality of divided blocks. The video decoder includes a parallel entropy decoding part configured to entropy decode the stream of the blocks contained in block lines, the stream of the blocks in each of the block lines being entropy decoded in parallel with the stream of the blocks in a corresponding one of the block lines, each of the block lines indicating an array of the blocks; a parallel QP prediction part configured to compute prediction values of quantization parameters of the blocks contained in the block lines, the prediction values of the blocks in each of the block lines being computed in parallel with the predication values of the blocks in a corresponding one of the block lines; and a parallel decoding processing part configured to generate decoded pixels with respect to the blocks contained in the block lines, the decoded pixels with respect to the blocks in each of the block lines being generated in parallel with the decoded pixels with respect to the blocks in a corresponding one of the block lines, each of the decoded pixels being decoded by utilizing data decoded by the parallel entropy decoding part and the prediction value computed by the parallel QP prediction part. In the video decoder, when the parallel QP prediction part performs the prediction value computing processing in parallel per unit of N block lines where the N is a value of two or greater, the parallel QP prediction part performs the prediction value computing processing on a processing block in a (K−1)th block line, which precedes a processing block in a Kth block line by at least one block in a horizontal position, so as to compute the prediction value of the processing block in the (K−1)th block line by referring to a block that has already been processed in the Kth block line corresponding to the processing block in the (K−1)th block line in the parallel processing.

The object and advantages of the invention will be realized and attained by means of the elements and combinations particularly pointed out in the appended claims.

It is to be understood that both the foregoing general description and the following detailed description are exemplary and explanatory and are not restrictive of the invention.

Additional objects and advantages of the embodiments will be set forth in part in the description which follows, and in part will be obvious from the description, or may be learned by practice of the invention.

BRIEF DESCRIPTION OF THE DRAWINGS

FIG. 1 is a diagram illustrating an example of parallel block line processing;

FIG. 2 is a diagram illustrating an example of parallel block line processing of an entropy processing part according to HEVC;

FIG. 4A is a diagram illustrating an example of block line parallel processing in QP prediction processing;

FIG. 5 is a block diagram illustrating a configuration example of a video decoder according to a first embodiment;

FIG. 10A is a diagram illustrating an example of QP prediction processing in the video decoder according to the first embodiment;

FIG. 10B is a diagram illustrating another example of the QP prediction processing in the video decoder according to the first embodiment;

FIG. 17 is a block diagram illustrating a configuration example of a video processing device according to a third embodiment.

MODE FOR CARRYING OUT THE INVENTION

Figure 3A:
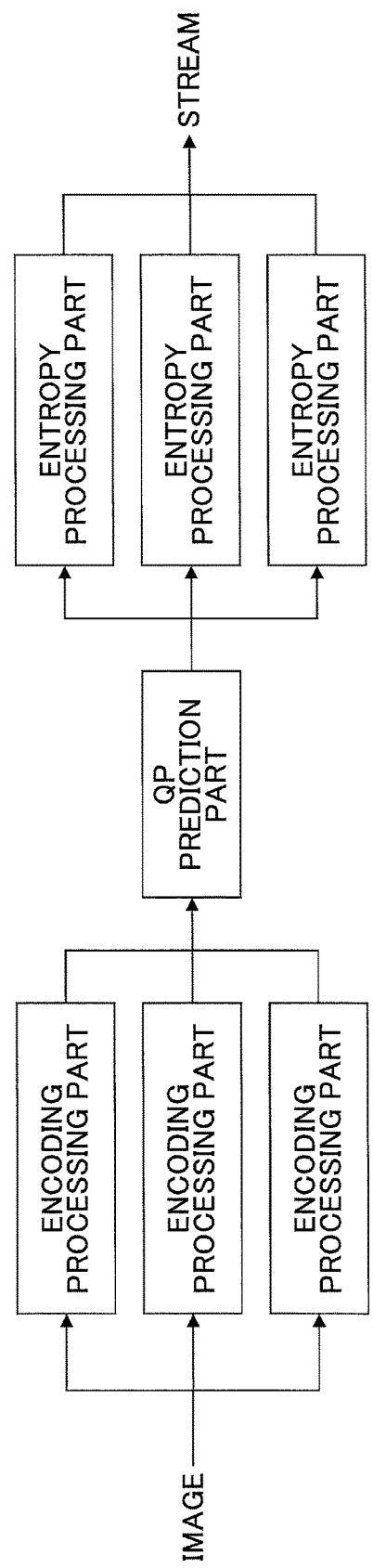
FIG. 3A is a block diagram illustrating a schematic configuration of a related-art encoder performing parallel block line processing.
Figure 3B:
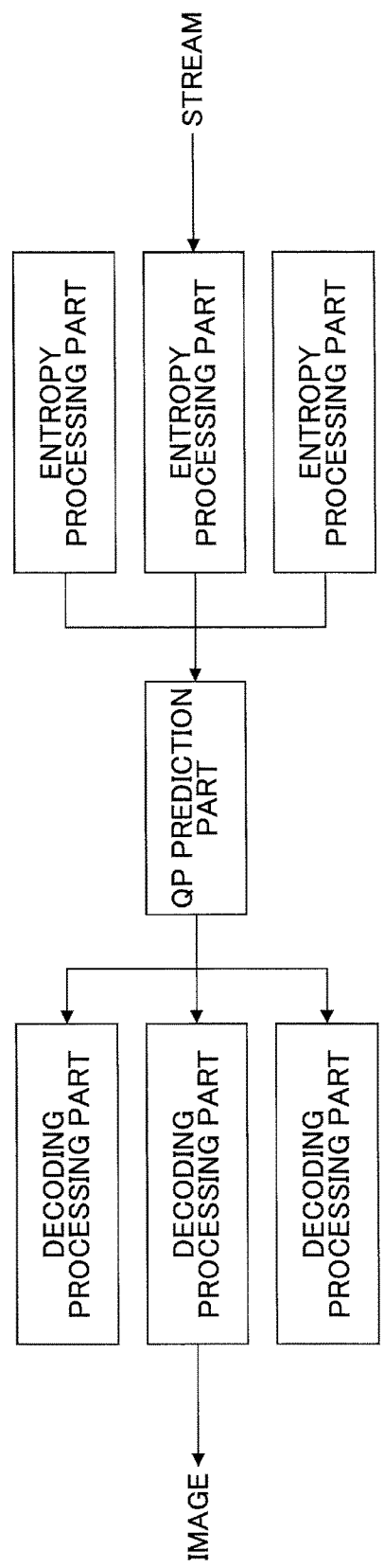
FIG. 3B is a block diagram illustrating a schematic configuration of a related-art decoder performing parallel block line processing.
Figure 4B:
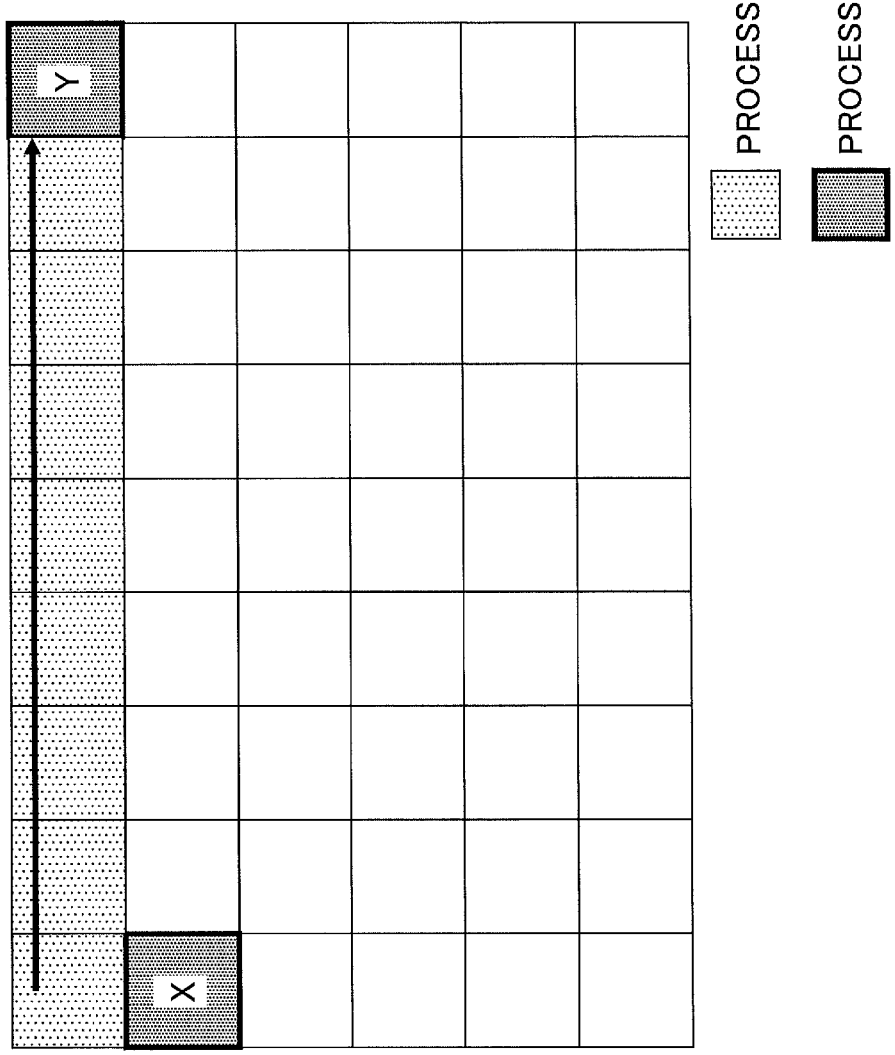
FIG. 4B is a diagram illustrating another example of block line parallel processing in the QP prediction processing.
Figure 4C:
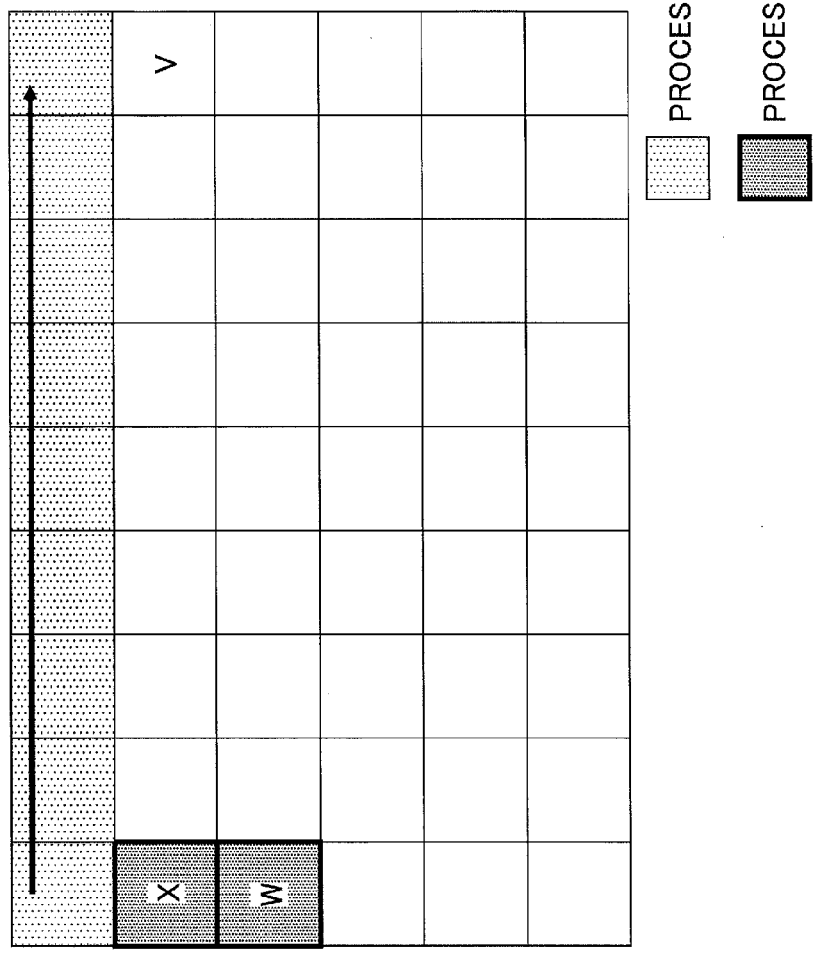
FIG. 4C is a diagram illustrating still another example of block line parallel processing in the QP prediction processing.

In the following, preferred embodiments will be described with reference to the accompanying drawings. Note that an image (picture) contained in a video may be any one of a frame and a field. The frame is one of still images of the video data, and the field is a still image obtained by acquiring data in odd-numbered lines or even-numbered lines from the frame.

Further, the video subjected to processing may be a color video or a monochrome video.

First Embodiment

Configuration

FIG. 5 is a block diagram illustrating a configuration example of a video decoder according to a first embodiment. In the example illustrated in FIG. 5, a video decoder 10 includes a parallel decoding part 101, and a decoded pixel storage part 105. The parallel decoding part 101 includes a parallel entropy decoding part 102, a parallel QP prediction part 103, and a parallel decoding processing part 104.

Note that the video decoder 10 is configured to process N block lines in parallel. Note also that the "block lines" indicate arrays of blocks in a horizontal direction within an image.

The respective components of the parallel decoding part 101 are configured to perform processing on an identical block for each of the block lines. Further, a horizontal position of a processing block in the (K−1)th block line is configured to precede a horizontal position of a processing block in the Kth block line by two or more blocks.

This may be because decoded information on the upper block and the upper right block of the processing block may be available (accessible) by shifting two or more blocks between the block lines even when the block lines are decoded in parallel. When only the decoded information of the upper block is accessed (utilized), the shifting amount of the horizontal position between the block lines may be one block. In the following, the "upper block" indicates one block above the processing block, the "upper right block" indicates a block on an immediate right side of the block above the processing block.

The parallel decoding part 101 is configured to decode an encoded stream obtained by encoding an image divided into plural blocks of utilizing a video encoding system. The parallel decoding part 101 may decode the encoded stream, for example, per unit of N block lines in parallel. Each of the pixels decoded per block in each of the block lines is output to the decoded pixel storage part 105. The pixels that are decoded are called "decoded pixels".

The parallel entropy decoding part 102 is configured to divide the input stream into the block lines, and entropy decode blocks of the stream contained in the block lines in parallel. The parallel entropy decoding part 102 outputs the entropy decoded data to the parallel decoding processing part 104.

The parallel QP prediction part 103 is configured to compute the prediction value (QP prediction value) of the quantization parameter (QP) of each of the blocks contained in the corresponding one of the block lines while performing the computing processing on the blocks contained in the block lines in parallel. The computed QP prediction values are output to the parallel decoding processing part 104.

The parallel decoding processing part 104 is configured to generate the decoded pixel corresponding to each of the blocks contained in the corresponding one of the block lines while generating the decoded pixels of the respective block lines in parallel. Each of the decoded pixels is decoded by utilizing data decoded by the parallel entropy decoding part 102 and the QP prediction value computed by the parallel QP prediction part 103. The generated decoded pixels are output to the decoded pixel storage part 105.

The decoded pixel storage part 105 is configured to store the decoded pixels of the blocks output from the parallel decoding part 101. The decoded pixels aggregated per image unit may form an image (a picture). The decoded pixel storage part 105 stores the decoded image output when the decoding processing for one picture completes.

Parallel Decoding Part

Figure 6:
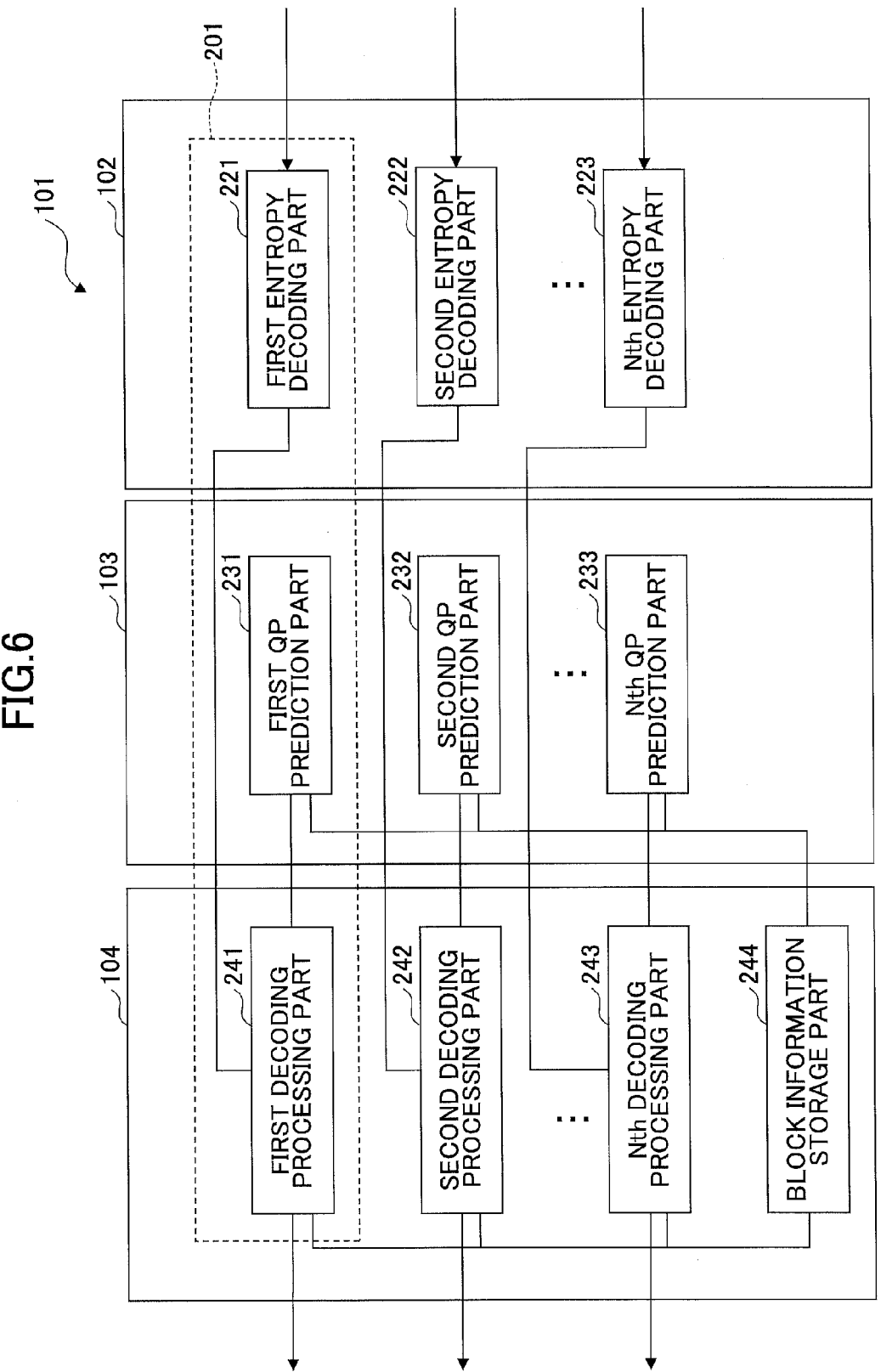
FIG. 6 is a block diagram illustrating configuration examples of respective components of a parallel decoding part of the video decoder according to the first embodiment.

Next, the parallel decoding part 101 is described. FIG. 6 is a block diagram illustrating configuration examples of respective components of the parallel decoding part 101 in the video decoder according to the first embodiment. In the example illustrated in FIG. 6, the parallel entropy decoding part 102 includes a first entropy decoding part 221, a second entropy decoding part 222, and an Nth entropy decoding part 223.

In the example illustrated in FIG. 6, the parallel QP prediction part 103 includes a first QP prediction part 231, a second QP prediction part 232, and an Nth QP prediction part 233. In the example illustrated in FIG. 6, the parallel decoding processing part 104 includes a first decoding processing part 241, a second decoding processing part 242, an Nth decoding processing part 243, and a block information storage part 244.

Note that when L=1 to N, the Lth entropy decoding part, the Lth QP prediction part, and the Lth decoding part are configured to perform processing on the same one of the block lines. In the following description, the Lth entropy decoding part, the Lth QP prediction part, and the Lth decoding part are generically called a "block line decoding processing part". For example, a block line decoding processing part 201 includes a first entropy decoding part 221, a first QP prediction part 231, and a first decoding processing part 241.

When the block line decoding processing part 201 has processed the Kth block line, the block line decoding processing part 201 subsequently processes the (K+N)th block line.

The parallel entropy decoding part 102 is configured to divide the input stream into block lines. The entropy decoding parts 221 to 223 entropy decode the block lines divided from the stream in parallel per unit of N block lines. The entropy decoding parts 221 to 223 are configured to perform entropy decoding processing corresponding to the entropy encoding processing in a video encoder.

Figure 7:
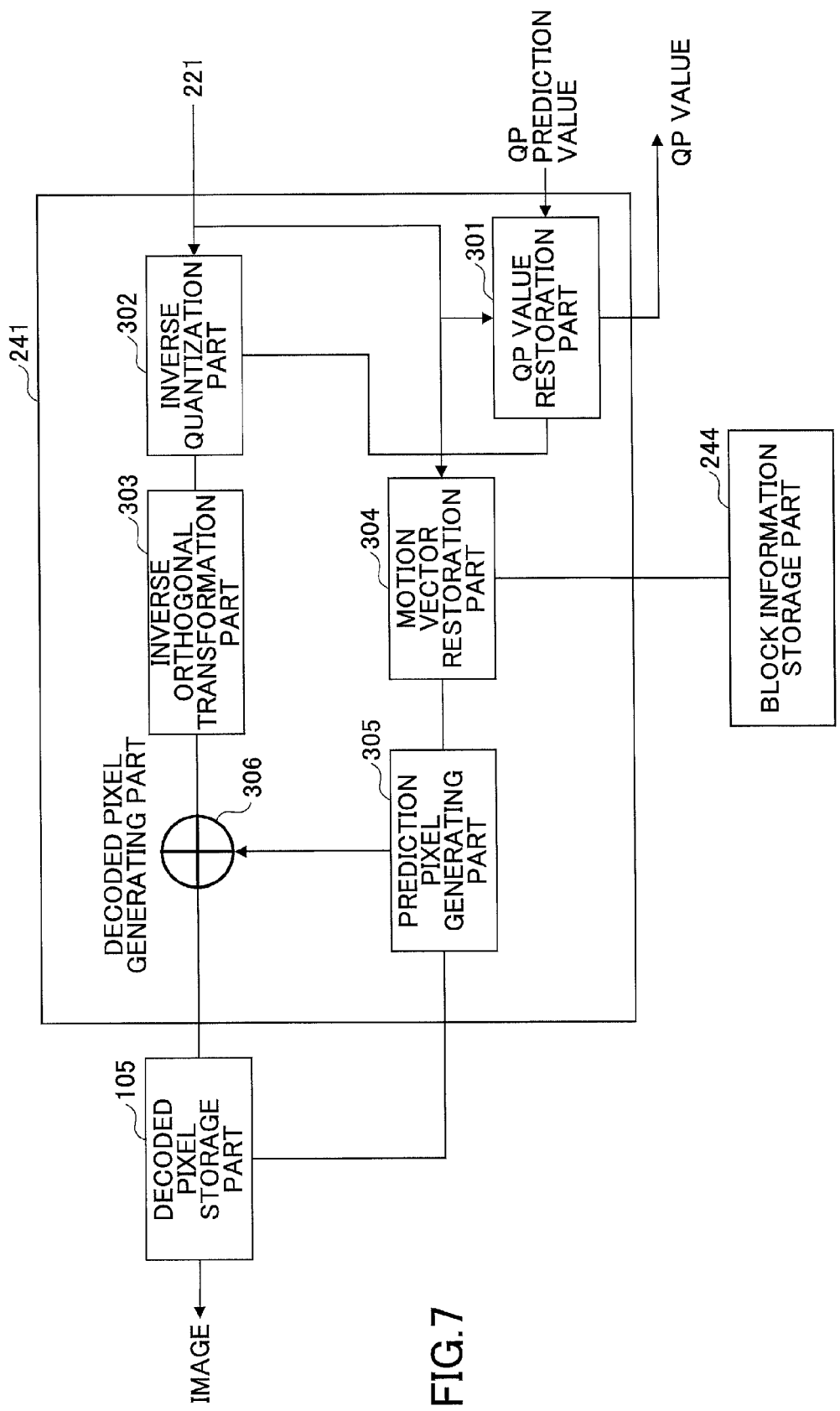
FIG. 7 is a block diagram illustrating a configuration example of a decoding processing part of the video decoder according to the first embodiment.

The decoding processing parts 241 to 243 are configured to perform decoding processing in parallel. FIG. 7 is a block diagram illustrating an example of the decoding processing part in the video decoder according to the first embodiment. Since the decoding processing parts 241 to 243 are configured to perform similar processing, the decoding processing part 241 is used as an example of the decoding processing parts in the following description.

The first decoding processing part 241 includes a QP value restoration part 301, an inverse quantization part 302, an inverse orthogonal transformation part 303, a motion vector restoration part 304, a prediction pixel generating part 305, and a decoded pixel generating part 306.

The QP value restoration part 301 is configured to restore the QP value utilizing a QP prediction value input from the later-described first QP prediction part 231 and a QP differential value input from the first entropy decoding part 221 (e.g., see the aforementioned formula (2)). The restored QP value is output to the inverse quantization part 302.

The inverse quantization part 302 is configured to perform inverse quantization by multiplying the restored QP value by an orthogonal transformation coefficient. The inverse quantized orthogonal transformation coefficient is output to the inverse orthogonal transformation part 303.

The inverse orthogonal transformation part 303 is configured to perform inverse orthogonal transformation on the orthogonal transformation coefficient input from the inverse quantization part 302 to generate a prediction error pixel. The generated prediction error pixel is output to the decoded pixel generating part 306.

The motion vector restoration part 304 is configured to acquire from the block information storage part 244 motion vector information on a block peripheral to the processing block to compute a prediction vector. The motion vector restoration part 304 is configured to add the prediction vector and the differential vector input from the first entropy decoding part 221 to restore the motion vector. The restored motion vector is output to the prediction pixel generating part 305.

The prediction pixel generating part 305 is configured to acquire pixel data of a reference picture indicated by the motion vector from the decoded pixel storage part 105 that stores pictures decoded previously to generate a prediction pixel. The generated prediction pixel is output to the decoded pixel generating part 306.

The decoded pixel generating part 306 is configured to add the prediction pixel input from the prediction pixel generating part 305 and the prediction error pixel input from the inverse orthogonal transformation part 303 to generate a decoded pixel. The generated decoded pixel is stored in the decoded pixel storage part 105.

Figure 8:
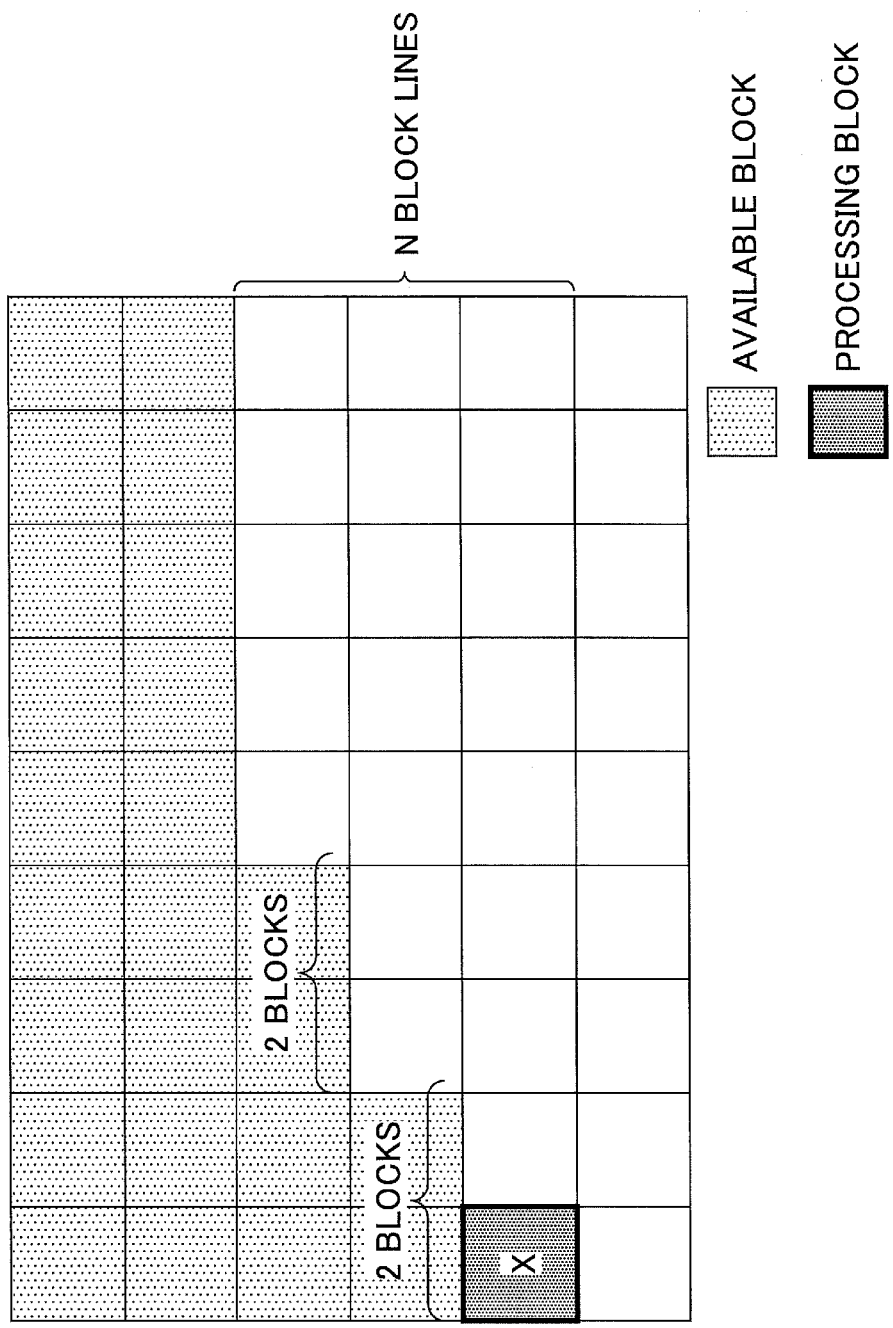
FIG. 8 is a block diagram illustrating an example of available blocks in parallel QP prediction processing in a case where N=3.

Next, processing performed by each of the QP prediction parts is described. Initially, available (accessible) blocks utilized in the prediction processing performed by each of the QP processing parts are described. FIG. 8 is a block diagram illustrating an example of available blocks utilized in parallel QP prediction processing in a case where N=3. In the example illustrated in FIG. 8, when N=3 indicates N block lines, QP prediction processing is performed on N block lines in parallel while delaying the processing by two blocks in each of the N block lines.

In this case, available blocks corresponding to the processing block X are shaded blocks illustrated in FIG. 8. The shaded blocks in FIG. 8 indicate already processed blocks when the processing block X is subjected to processing; that is, the shaded blocks in FIG. 8 indicate the available (accessible) blocks. In FIG. 8, the block indicated by a thick frame depicts a block subjected to processing (hereinafter also called a "processing block"). Each of the QP prediction parts is configured to compute the QP prediction value of the processing block by referring to the available blocks (already processed blocks). In the following, the computation of the QP prediction value is described further in detail.

Figure 9:
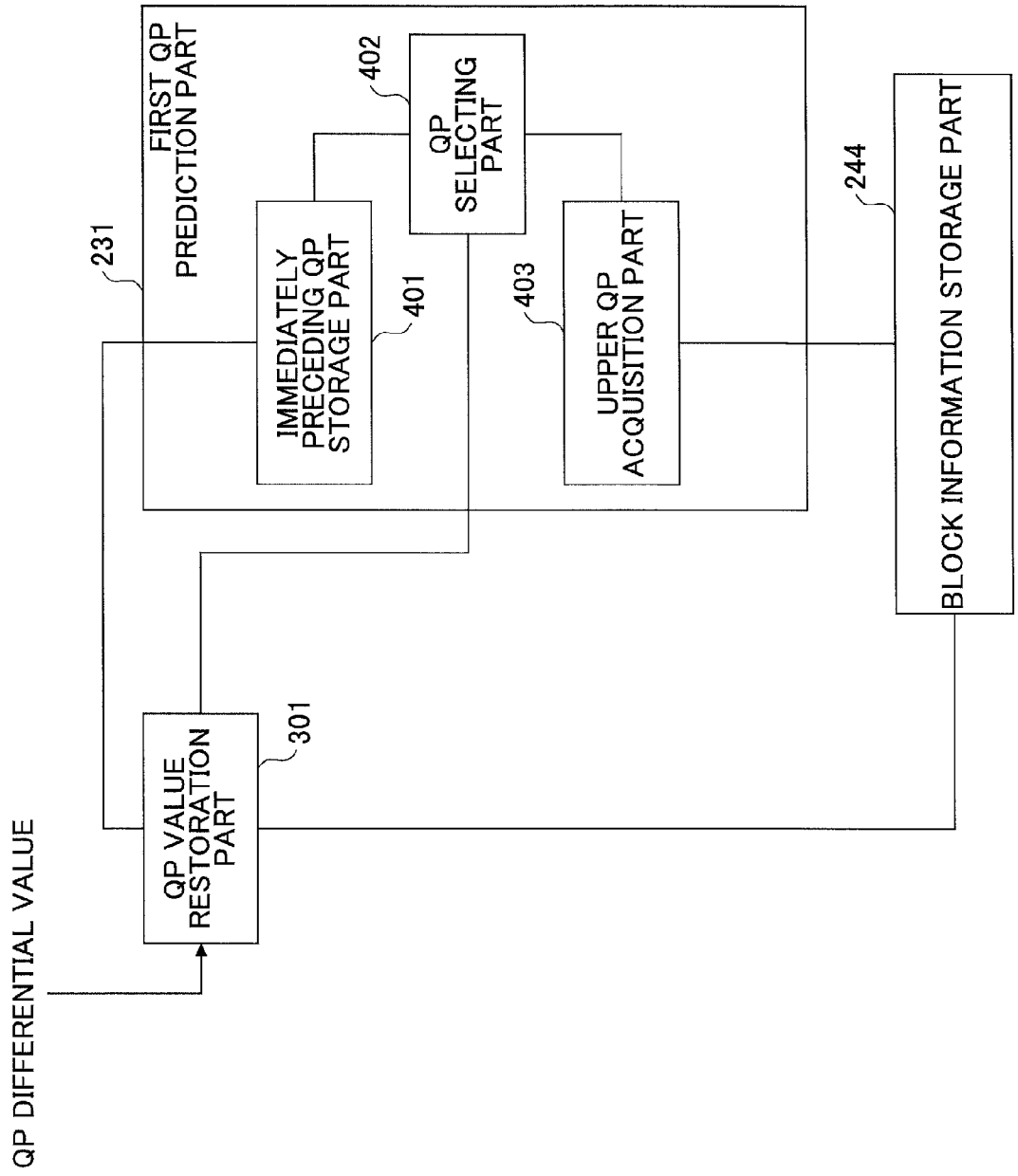
FIG. 9 is a block diagram illustrating a configuration example of a QP prediction part of the video decoder according to the first embodiment.

FIG. 9 is a block diagram illustrating a configuration example of the QP prediction part in the video decoder according to the first embodiment. Since the QP prediction parts 231 to 233 are configured to perform similar processing, the first QP prediction part 231 is used as an example of the QP prediction parts in the following description.

In FIG. 9, the first QP prediction part 231 includes an immediately preceding QP storage part 401, a QP selecting part 402, and an upper QP acquisition part 403.

The immediately preceding QP storage part 401 is configured to receive from the QP value restoration part 301 the QP value of the block that has been processed immediately before the current processing block, and store the received QP value. The QP value stored by the immediately preceding QP storage part 401 is initialized at the time of starting picture processing.

For example, the QP value stored by the immediately preceding QP storage part 401 is initialized with a Slice QP value encoded by Slice header information in a manner similar to H.264. The Slice is a unit of divided groups of blocks associated with one picture.

The upper QP acquisition part 403 may, for example, acquire a QP value of a block located above the processing block from the block information storage part 244.

The QP selecting part 402 is configured to select one of the QP values output from the immediately preceding QP storage part 401 and the upper QP acquisition part 403 to output the selected QP value as the QP prediction value to the QP value restoration part 301.

For example, when the processing block is a first one (a head) of blocks in a block line, the QP selecting part 402 selects the QP value output from the upper QP acquisition part 403, whereas when the processing block is any one of the blocks other than the first block in the block line, the QP selecting part 402 selects the QP value output from the immediately preceding QP storage part 401. The QP selecting part 402 outputs the selected QP value as the QP prediction value to the QP value restoration part 301.

Next, the prediction (selection) of the QP value in the above example is described with reference to the corresponding drawings. FIG. 10A is a diagram illustrating an example of QP prediction processing in the video decoder according to the first embodiment. In the example illustrated in FIG. 10A, when the processing block X represents a block subjected to processing, and the processing block X is a first one (a head) of the blocks in the block line, the QP selecting part 402 selects a QP value of an upper block A.

FIG. 10B is a diagram illustrating another example of QP prediction processing in the video decoder according to the first embodiment. As illustrated in FIG. 10B, when the processing block X is one of the blocks other than the first block in the block line, the QP selecting part 402 selects a QP value of a block B that has been processed immediately before the processing block X.

Note that the QP value of the block close to the processing block X is utilized as the QP prediction value in this case. Accordingly, the prediction efficiency of the QP value scarcely lowers compared to a case in which the QP value of the block that has been processed immediately before the processing block X is selected (utilized) in the raster order.

In the above example, the QP prediction value is generated by utilizing the QP value of the block that has been processed immediately before the processing block X when the processing block is other than the first block. However, the QP value may be generated by other methods when the QP value is predicted from a block adjacent to the processing block.

Further, the processing of the QP selecting part 402 may be as follows. When the block line subjected to processing is a second block line to the Nth block line, the QP values stored by the immediately preceding QP storage part 401 are the Slice QP values, each of which is determined by a Slice unit. Accordingly, the prediction efficiency may be relatively low when the Slice QP value is applied as the QP prediction value of each of the blocks.

Thus, when the processing block is the first one of the blocks in the second block line to Nth block line, the QP selecting part 402 may select the QP value acquired by the upper QP acquisition part 403, whereas when the processing block is any one of the blocks other than the first block in the second block line to Nth block line, the QP selecting part 402 may select the QP value retained by the immediately preceding QP storage part 401.

Further, when the processing block is a first one of blocks in a block line subsequent to the (N+1)th block line, the QP selecting part 402 may select the QP value retained by the immediately preceding QP storage part 401. In this case, the QP value retained by the immediately preceding QP storage part 401 corresponds to the QP value of the last one (the last block) of the blocks in the block line located N blocks above the processing block.

The Kth block line and the (K+N)th block line are processed by the identical decoding processing part, the identical QP prediction part, and the identical entropy decoding part. Therefore, the block that has been processed immediately before the processing block in the Kth block line corresponds to the last block of the (K−N)th block line.

Further, when the processing block is the first one of the blocks in the block line, the QP selecting part 402 may be configured to constantly select the QP value stored in the immediately preceding QP storage part 401. Further, when the processing block is the first one of the blocks in one of the first block line to Nth block line, the QP selecting part 402 may be configured to select the Slice QP value as the QP prediction value.

In this case, the QP value of the last one (the last block) of the blocks in the block line located N blocks above the processing block may be selected as the QP prediction value of the first block in the (N+1)th block line.

With the above configuration, the process of computing the prediction values of the quantization parameters corresponding to the block lines may be performed in parallel.

Operation

Figure 11:
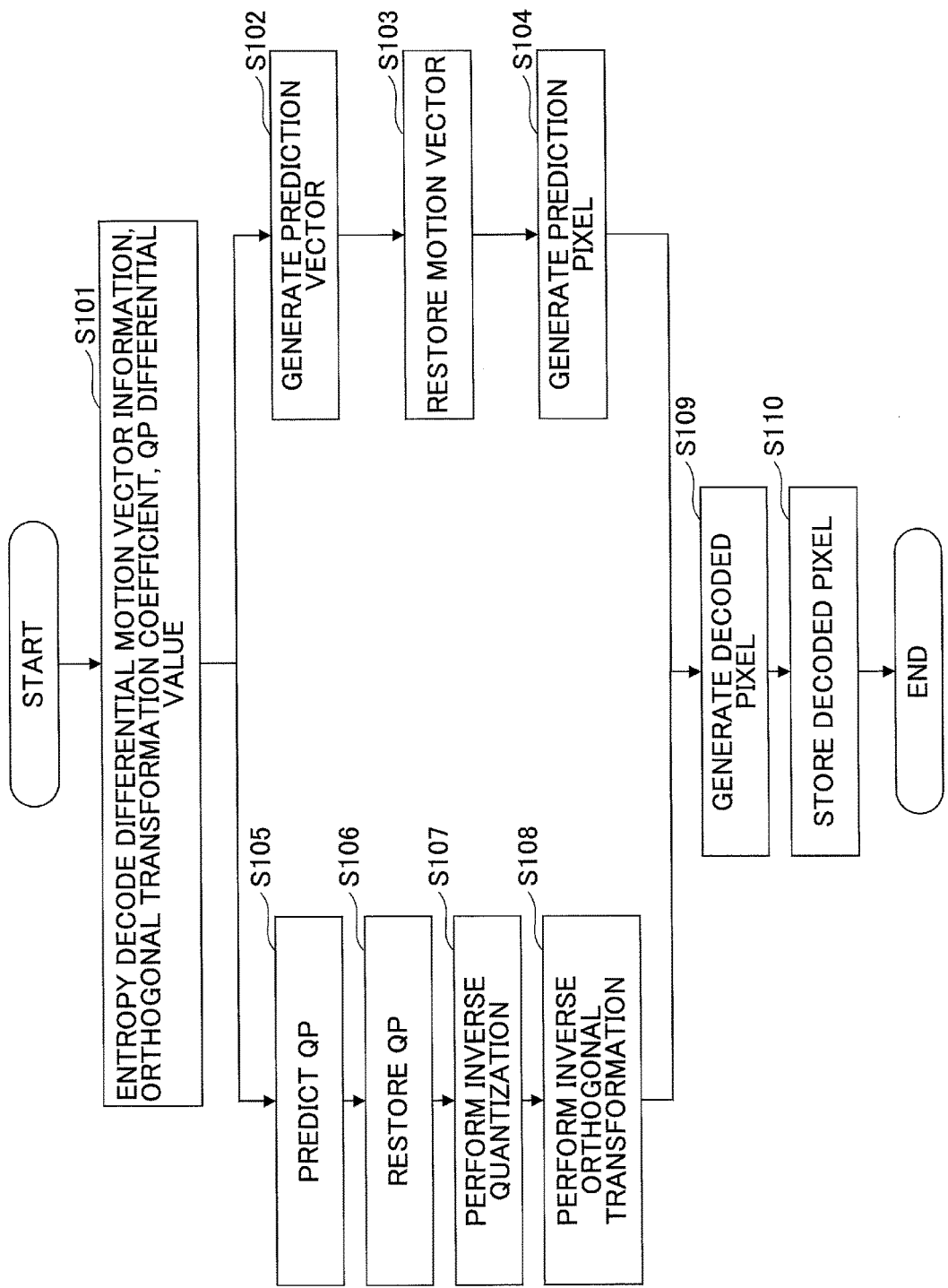
FIG. 11 is a flowchart illustrating an example of block decoding processing in the video decoder according to the first embodiment.

Next, operations of the video decoder 10 according to the first embodiment are described. FIG. 11 is a flowchart illustrating an example of block decoding processing in the first embodiment. Note that the block decoding processing illustrated in FIG. 11 corresponds to decoding processing performed on one block.

In step S101, each of the entropy decoding parts entropy decodes encoded information such as the differential motion vector, the QP differential value, and the quantized orthogonal transformation coefficient of each of the blocks. The entropy decoded information is output to the decoding processing parts corresponding to the entropy processed parts.

In step S102, the motion vector restoration part 304 acquires from the block information storage part 244 motion vector information on a block peripheral to the processing block to compute a prediction vector.

In step S103, the motion vector restoration part 304 adds the differential motion vector and the prediction vector to restore the motion vector. The restored motion vector information is stored in the block information storage part 244.

In step S104, the prediction pixel generating part 305 acquires pixel data of a reference picture indicated by the motion vector from the decoded pixel storage part 105 that stores pictures decoded previously to generate a prediction pixel.

In step S105, each of the QP prediction parts generates the QP prediction value of a corresponding one of the blocks to input the generated QP prediction values into the QP value restoration part 301.

In step S106, the QP value restoration part 301 restores each of the QP values based on the corresponding input QP prediction value and differential value. The QP values are stored in the block information storage part 244 while being supplied to the inverse quantization part 302. When one of the QP value of the block above the processing block and the QP value of the processed block processed by the block line decoding processing part 201 previously is applied to the QP prediction value, there may be no need for holding (delaying) the generation of the QP prediction value. As a result, the efficiency of the parallel processing may be improved.

In step S107, the inverse quantization part 302 multiplies the quantized orthogonal transformation coefficient by the QP value.

In step S108, the inverse orthogonal transformation part 303 performs inverse orthogonal transformation on the quantized orthogonal transformation coefficient to generate a prediction error pixel.

In step S109, the decoded pixel generating part 306 adds the prediction error pixel and the prediction pixel to generate a decoded pixel.

In step S110, the decoded pixel storage part 105 stores the decoded pixel. The aforementioned step is the end of the decoding processing on the block (processing block), which initiates the next decoding processing on the subsequent block. When the decoding processing on all the blocks contained in one picture are finished, the decoded image stored in the decoded pixel storage part 105 may, for example, be displayed on a display part such as a display.

As described above, in the video decoder according to the first embodiment, the computation of the QP prediction values may be performed in parallel, which may improve the efficiency of the parallel block line processing.

Second Embodiment

Next, a video encoder according to a second embodiment is described. In the video encoder according to the second embodiment, the QP prediction processing may be performed in parallel per a unit of block lines, corresponding to the video decoder according to the first embodiment.

Configuration

Figure 12:
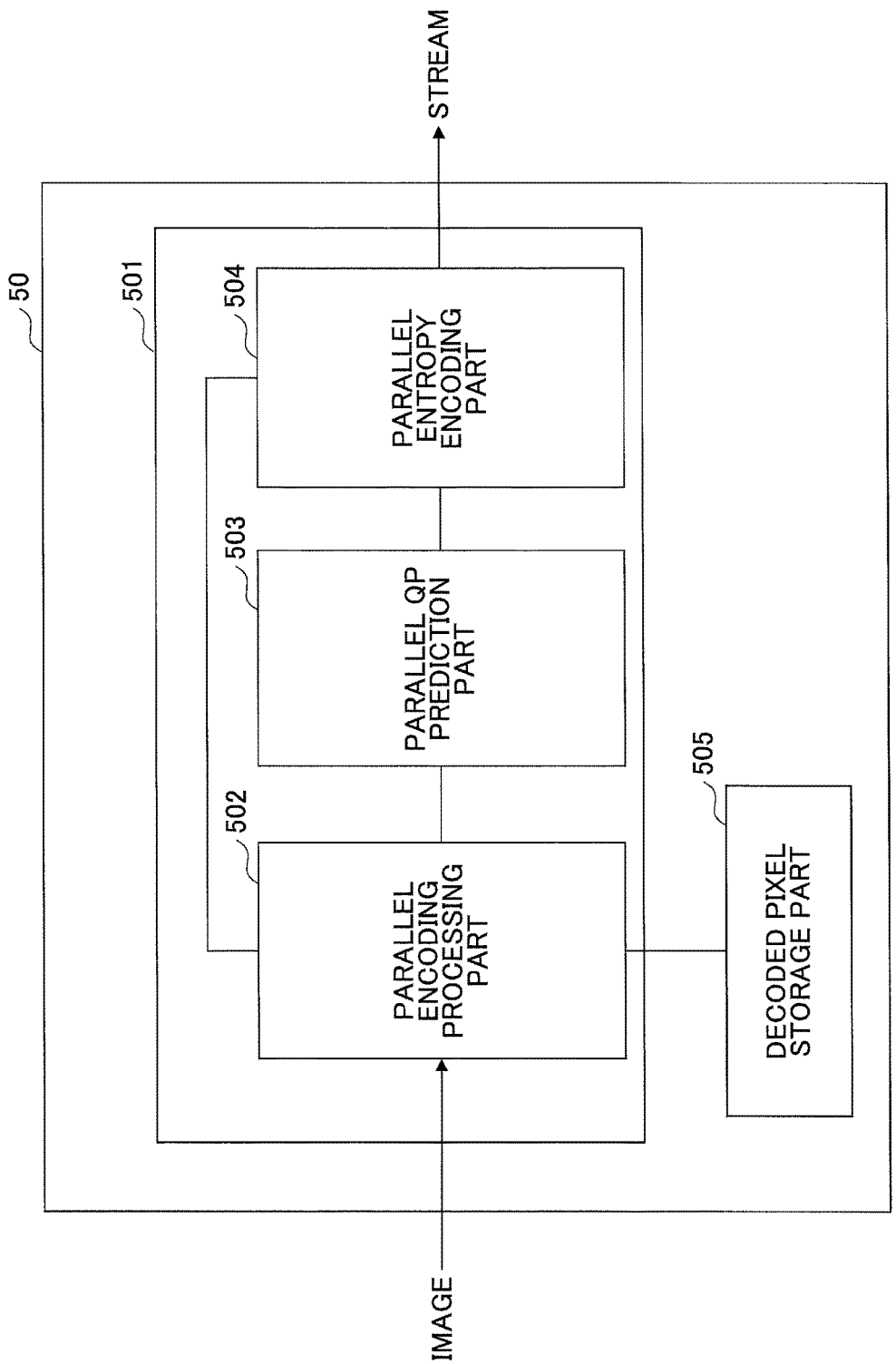
FIG. 12 is a block diagram illustrating a configuration example of a video encoder according to a second embodiment.

FIG. 12 is a block diagram illustrating a configuration example of a video encoder 50 according to the second embodiment. In the example illustrated in FIG. 12, the video encoder 50 includes a parallel encoding part 501 and a decoded pixel storage part 505. The parallel decoding part 501 includes a parallel encoding processing part 502, a parallel QP prediction part 503, and a parallel entropy encoding part 504. Note that the video encoder 50 is configured to process N block lines in parallel.

The respective components of the parallel encoding part 501 are configured to perform processing on an identical block for each of the block lines. Further, a horizontal position of a processing block of the (K−1)th block line is configured to precede a horizontal position of a processing block of the Kth block line by two or more blocks.

This may be because encoded information on the upper block and the upper right block of the processing block may be available (accessible) by shifting two or more blocks between the block lines even when the block lines are encoded in parallel. When the information of the upper block is accessed (utilized), the shifting amount of the horizontal position between the block lines may be one block.

The parallel encoding part 501 is configured to divide an image into plural blocks, and encode the divided blocks utilizing a video encoding system in, for example, N block lines in parallel. The decoded pixel locally decoded by the parallel encoding part 501 is stored in the decoded pixel storage part 505.

The parallel encoding processing part 502 is configured to generate the quantized orthogonal transformation coefficient and the differential motion vector information for each of blocks contained in the block lines while processing the block lines in parallel. The generated orthogonal transformation coefficients and differential vector information (also called "encoding data") are output to the parallel entropy encoding part 504. The QP value utilized for the quantization is output to the parallel QP prediction part 503.

The parallel QP prediction part 503 is configured to compute the prediction value (QP prediction value) of the quantization parameter (QP) of each of the blocks contained in the corresponding block line while performing the computing processing on the blocks contained in the block lines in parallel. The computed QP prediction values are output to the parallel entropy encoding part 504.

The parallel entropy encoding part 504 entropy encodes each of the blocks contained in the corresponding block line utilizing the quantized orthogonal transformation coefficient, the QP differential value that is the difference between the QP value and the QP prediction value, the differential motion vector information and the like while performing entropy encoding processing on the blocks contained in the block lines in parallel. The stream encoded by the parallel entropy encoding part 504 is output to the video decoder 10, and the like.

The decoded pixel storage part 505 is configured to store the decoded pixel obtained by locally decoding each of the blocks output from the parallel encoding part 501. The decoding locally may also be called "local decode".

Parallel Encoding Part

Figure 13:
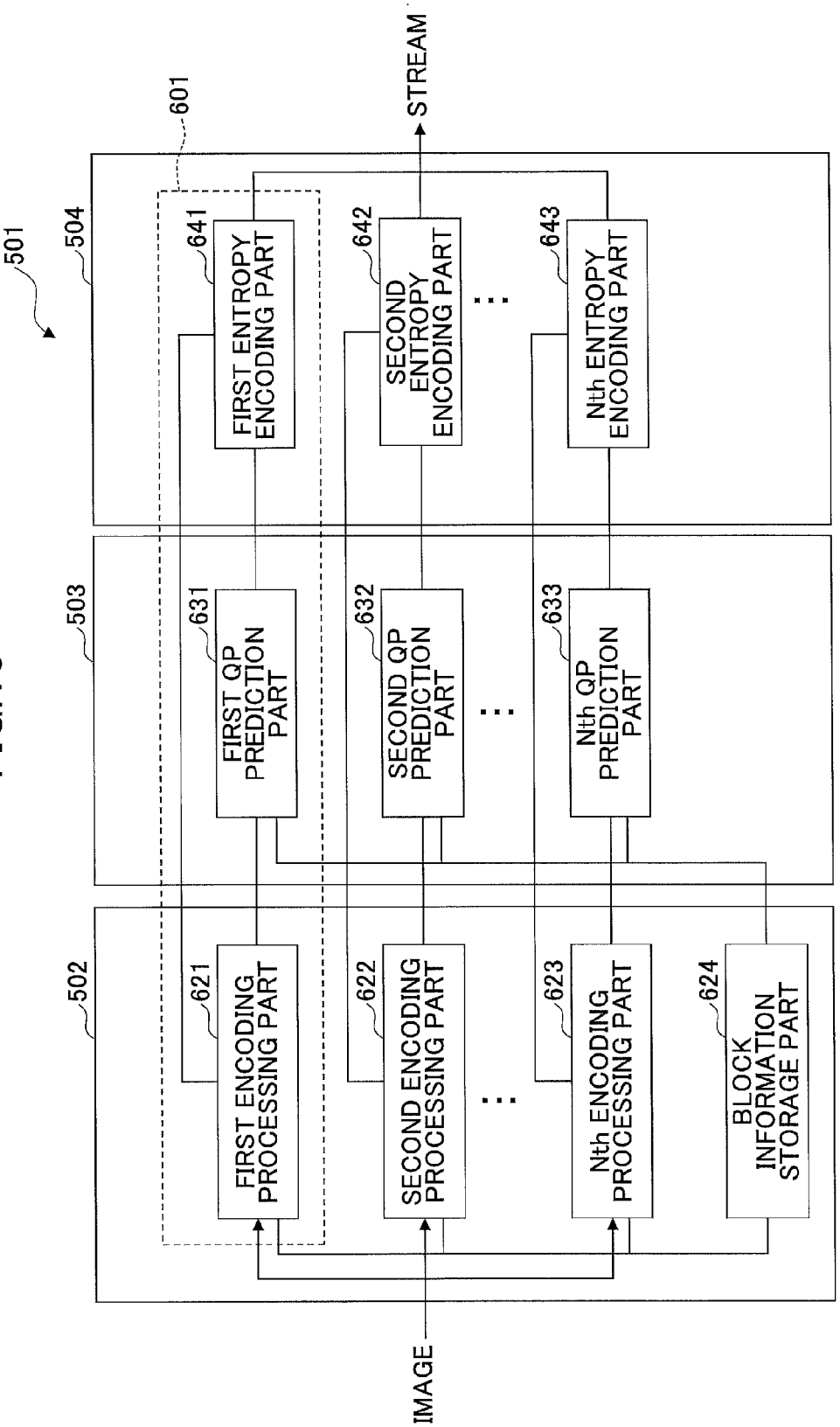
FIG. 13 is a block diagram illustrating configuration examples of respective components of a parallel encoding part in the video encoder according to the second embodiment.

Next, the parallel encoding part 501 is described. FIG. 13 is a block diagram illustrating configuration examples of respective components of the parallel encoding part 501 in the video encoder according to the second embodiment. In the example illustrated in FIG. 13, the parallel encoding processing part 502 includes a first encoding processing part 621, a second encoding processing part 622, an Nth encoding processing part 623, and a block information storage part 624.

In the example illustrated in FIG. 13, the parallel QP prediction part 503 includes a first QP prediction part 631, a second QP prediction part 632, and an Nth QP prediction part 633. In the example illustrated in FIG. 13, the parallel entropy encoding part 504 includes a first entropy encoding part 641, a second entropy encoding part 642 and an Nth entropy encoding part 643.

Note that when L=1 to N, the Lth encoding part, the Lth QP prediction part, and the Lth entropy encoding part are configured to perform processing on the same one of the block lines. In the following description, the Lth encoding part, the Lth QP prediction part, and the Lth entropy encoding part are generically called a "block line encoding processing part".

For example, a block line encoding processing part 601 includes a first encoding part 621, a first QP prediction part 631, and a first entropy encoding processing part 641.

When the block line encoding processing part 601 has performed encoding processing on the Kth block line, the block line encoding processing part 601 subsequently performs encoding processing on the (K+N)th block line.

The parallel entropy encoding part 502 is configured to divide an input image into plural block lines. The encoding processing parts 621 to 623 are configured to perform encoding processing in parallel per unit of the divided block lines of the image (e.g., N block lines in this case). The encoding processing may be encoding processing such as H.264 or HEVC.

Figure 14:
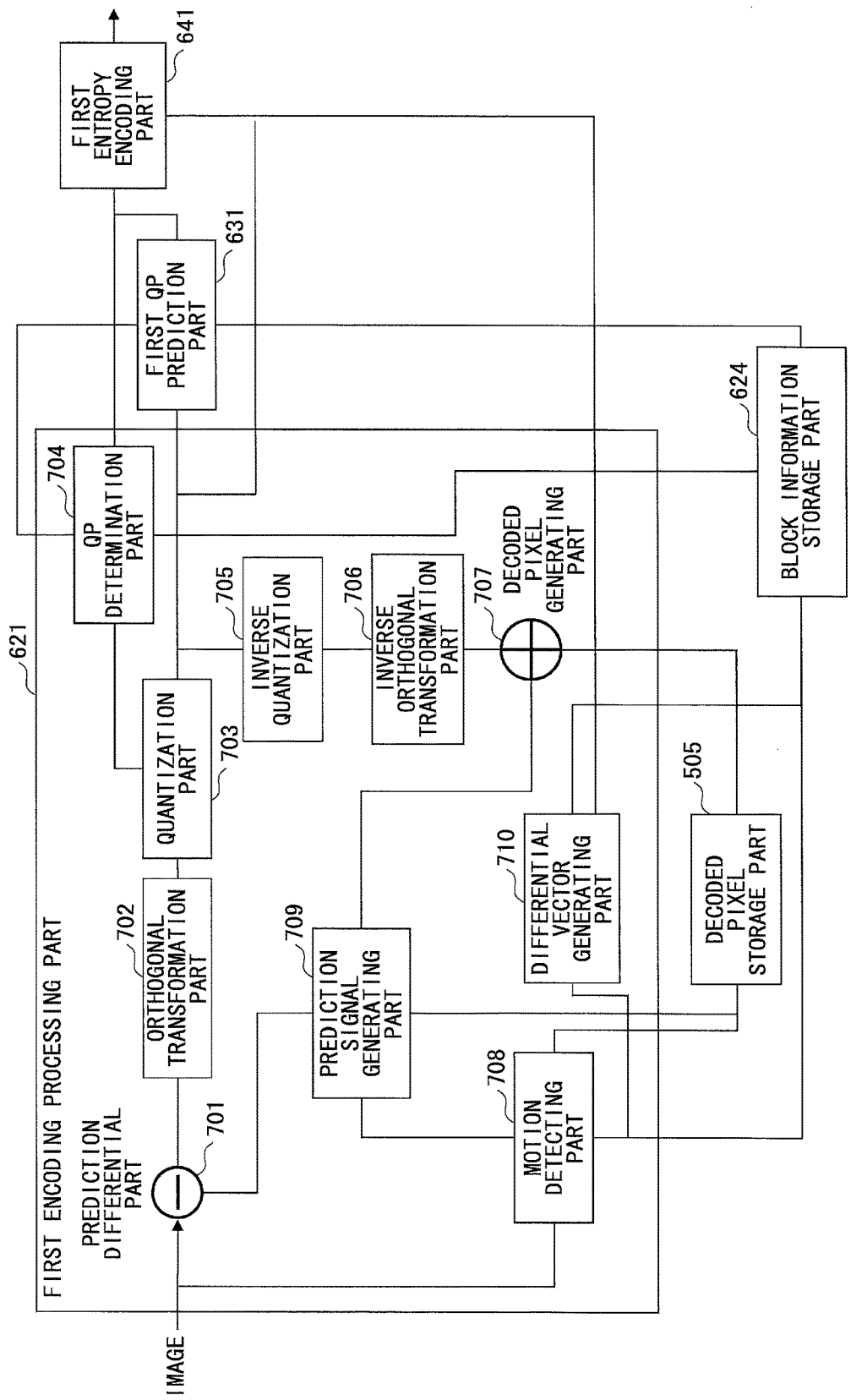
FIG. 14 is a block diagram illustrating a configuration example of an encoding processing part of the video encoder according to the second embodiment.

FIG. 14 is a block diagram illustrating a configuration example of the encoding processing part (e.g., the first encoding processing part 621) in the video encoder according to the second embodiment. Since the encoding processing parts 621 to 623 are configured to perform similar processing, the encoding processing part 621 is used as an example of the encoding processing parts in the following description.

The first encoding processing part 621 includes a prediction differential part 701, an orthogonal transformation part 702, a quantization part 703, a QP determination part 704, an inverse quantization part 705, an inverse orthogonal transformation part 706, a decoded pixel generating part 707, a motion detecting part 708, a prediction signal generating part 709, and a differential vector generating part 710.

The motion detecting part 708 is configured to acquire pixel data of a reference picture from the decoded pixel storage part 505 to detect a motion vector. The detected motion vector information is stored in the block information storage part 624 to be used for next encoding.

The prediction signal generating part 709 is configured to acquire a reference pixel from the decoded pixel storage part 505 to generate a prediction pixel signal based on regional position information of the input reference image. The generated prediction pixel signal is output to the differential vector generating part 701.

The differential vector generating part 110 is configured to generate a prediction vector. The prediction vector may be obtained as follows. Motion vectors of blocks located on the left side, above, and on the upper right side of the processing block are acquired from the block information storage part 624, and a median value of the three motion vectors may be determined as the prediction vector.

As described in the above example, since the processing block of each of the block lines is shifted by two blocks in a horizontal direction from the processing block of the preceding block line, encoding processing on the block located above the processing block and the block located on the upper right side of the processing block has already been completed. Thus, the differential vector generating part 710 may be able to acquire the motion vectors of the peripheral blocks.

The differential vector generating part 710 is configured to acquire the motion vector of the processing block from the motion detecting part 708 to generate the differential vector between the motion vector and the prediction vector. The generated differential vector is output to the first entropy encoding part 641.

The prediction differential part 701 is configured to compute the difference between the original image and the prediction pixel signals to generate prediction error signals. The generated prediction error signals are output to the orthogonal transformation part 702.

The orthogonal transformation part 702 is configured to perform orthogonal transformation processing such as discrete cosine transform (DCT) on the prediction error signals. The obtained orthogonal transformation coefficients are output to the quantization part 703.

The quantization part 703 is configured to quantize the orthogonal transformation coefficients based on the quantization parameter (QP). An example of the quantization method includes dividing the orthogonal coefficients by a value determined by the QP, and rounding the obtained result to the nearest integer. The quantized orthogonal transformation coefficient is multiplied by the QP value to perform the inverse quantization. The rounding processing may make the quantization irreversible transformation. The quantized orthogonal transformation coefficients are output to the first entropy encoding part 641.

The quantization part 703 is configured to generate flag information as to whether the quantized orthogonal transformation coefficients are all "0" to output the generated flag information together with the QP values utilized for the quantization to the QP determination part 704. The QP values are output to the inverse quantization part 705 and the first QP prediction part 631.

The first QP prediction part 631 is configured to generate the QP prediction value of the processing block. The generated QP prediction value is output to the QP determination part 704, and the first entropy encoding part 641.

When one of the QP value of the block above the processing block and the QP value of the processed block processed by the block line encoding processing part 601 associated with the first QP prediction part 631 previously is applied to the QP prediction value, there may be no need for holding (delaying) the generation of the QP prediction value. As a result, the efficiency of the parallel processing may be improved.

The QP determination part 704 is configured to determine the QP of the processing block based on the QP value input from the quantization part 703 and the prediction value.

When the orthogonal transformation coefficients are all "0", the QP differential information will not be entropy encoded. Therefore, the QP values utilized by the quantization part 703 will not be reported to the decoder side. As a result, such QP values may be invalidated.

For example, the QP determination part 704 acquires the flag information as to whether the quantized orthogonal transformation coefficients generated by the quantization part 703 are all "0". When the QP determination part 704 acquires the flag information indicating that the orthogonal transformation coefficients are all "0", the QP determination part 704 sets the QP prediction value as the QP value of the processing block. When the QP determination part 704 acquires the flag information indicating that none of the orthogonal transformation coefficients are "0", the QP determination part 704 sets the QP value utilized by the quantization part 703 as the QP value of the processing block. The QP value determined by the QP determination part 704 is stored in the block information storage part 624.

The inverse quantization part 705 is configured to perform inverse quantization processing on the quantized orthogonal transformation coefficients. The inversely quantized orthogonal coefficients are output to the inverse orthogonal transformation part 706.

The inverse orthogonal transformation part 706 is configured to perform inverse orthogonal transformation on the quantized orthogonal transformation coefficients. The inverse orthogonal transformation processed signals are output to the decoded pixel generating part 707.

The decoded pixel generating part 707 is configured to add the prediction pixel signal acquired from the prediction signal generating part 709 to the inverse orthogonal transformation processed signal so as to generate a locally decoded pixel. The generated decoded pixel is stored in the decoded pixel storage part 505.

Figure 15:
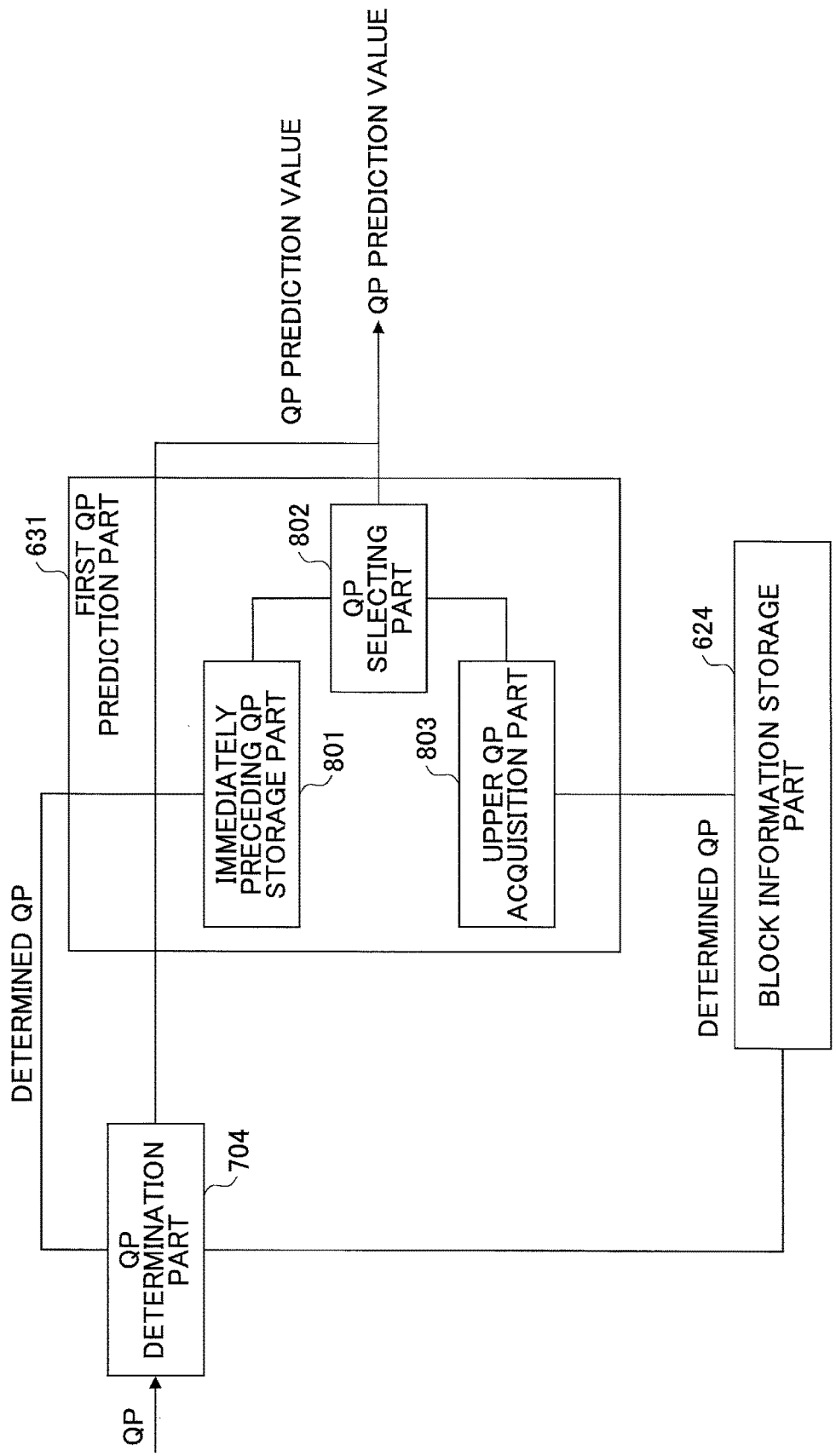
FIG. 15 is a block diagram illustrating a configuration example of a QP prediction part of the video encoder according to the second embodiment.

Next, processing performed by each of the QP prediction parts is described. FIG. 15 is a block diagram illustrating a configuration example of a QP prediction part in the video encoder according to the second embodiment. Since the QP prediction parts 631 to 633 are configured to perform similar processing, the first QP prediction part 631 is used as an example of the QP prediction parts in the following description.

In FIG. 15, the first QP prediction part 631 includes an immediately preceding QP storage part 801, a QP selecting part 802, and an upper QP acquisition part 803.

The immediately preceding QP storage part 801 is configured to receive from the QP determination part 704 the QP value of the block that has been processed immediately before the current processing block, and store the received QP value. The QP values stored by the immediately preceding QP storage part 801 are initialized at the time of starting picture processing.

For example, the QP value stored by the immediately preceding QP storage part 401 is initialized with a Slice QP value encoded by Slice header information in a manner similar to H.264. The Slice is a unit of divided groups of blocks associated with one picture.

The upper QP acquisition part 803 may acquire a QP value of a block located above the processing block from the block information storage part 624.

The QP selecting part 802 is configured to select one of the QP values output from the immediately preceding QP storage part 801 and the upper QP acquisition part 803 to output the selected QP value as the QP prediction value to the QP determination part 704 or to the first entropy encoding part 641.

For example, when the processing block is a first one (a head) of blocks in a block line, the QP selecting part 802 selects the QP value output from the upper QP acquisition part 803, whereas when the processing block is any one of the blocks in the block line other than the first block, the QP selecting part 802 selects the QP value output from the immediately preceding QP storage part 801. The QP selecting part 802 outputs the selected QP value as the QP prediction value to the QP determination part 704 or to the first entropy encoding part 641.

The prediction (selection) of the QP value in the above examples is illustrated in FIGS. 10A and 10B. In this case, the QP value of the block close to the processing block X is utilized as the QP prediction value. Accordingly, the prediction efficiency of the QP value scarcely lowers compared to the case utilizing (selecting) the QP value of the block immediately before the processing block X in the raster order.

In the above example, the QP prediction value is generated by utilizing the QP value of the block that has been processed immediately before the processing block X when the processing block is other than the first block. However, the QP value may be generated by other methods when the QP value is predicted from a block adjacent to the processing block.

Note that the processing of the QP selecting part 802 in the video encoder 50 according to the second embodiment may be as follows in a manner similar to the video decoder 10 according to the first embodiment. When the block line subjected to processing is the second block line to the Nth block line, the QP values stored by the immediately preceding QP storage part 801 are the Slice QP values, each of which is determined by a Slice unit. Accordingly, the prediction efficiency may be relatively low when the Slice QP value is applied as the QP prediction value of each of the blocks.

Thus, when the processing block is the first one of the blocks in the second block line to Nth block line, the QP selecting part 802 may select the QP value acquired by the upper QP acquisition part 803, whereas when the processing block is any one of the blocks other than the first block in the second block line to Nth block line, the QP selecting part 802 may select the QP value retained by the immediately preceding QP storage part 801.

Further, when the processing block is a first one of blocks in a block line subsequent to the (N+1)th block line, the QP selecting part 802 may select the QP value retained by the immediately preceding QP storage part 801. In this case, the QP value retained by the immediately preceding QP storage part 801 corresponds to a QP value of the last one (the last block) of the blocks in the block line located N blocks above the processing block.

The Kth block line and the (K+N)th block line are processed by the identical decoding processing part, the identical QP prediction part, and the identical entropy decoding part. Therefore, the block that has been processed immediately before the processing block in the Kth block line corresponds to the last block of the (K−N)th block line.

Further, when the processing block is a first one (a head) of blocks in a block line, the QP selecting part 802 may be configured to constantly select a QP value stored in the immediately preceding QP storage part 801. Further, when the processing block is a first one of blocks in one of the first block line to Nth block line, the QP selecting part 802 may be configured to select the Slice QP value as the QP prediction value.

In this case, the QP value of the last one (the last block) of the blocks in the block line located N blocks above the processing block may be selected as the QP prediction value of the first block in the (N+1)th block line.

Each of the entropy encoding parts 641 to 643 entropy encodes the differential motion vector, the QP differential value, the quantized orthogonal transformation coefficient of each of the blocks for a corresponding one of the block lines.

With the above configuration, the prediction values of the quantization parameters corresponding to the block lines may be performed in parallel.

Operation

Figure 16:
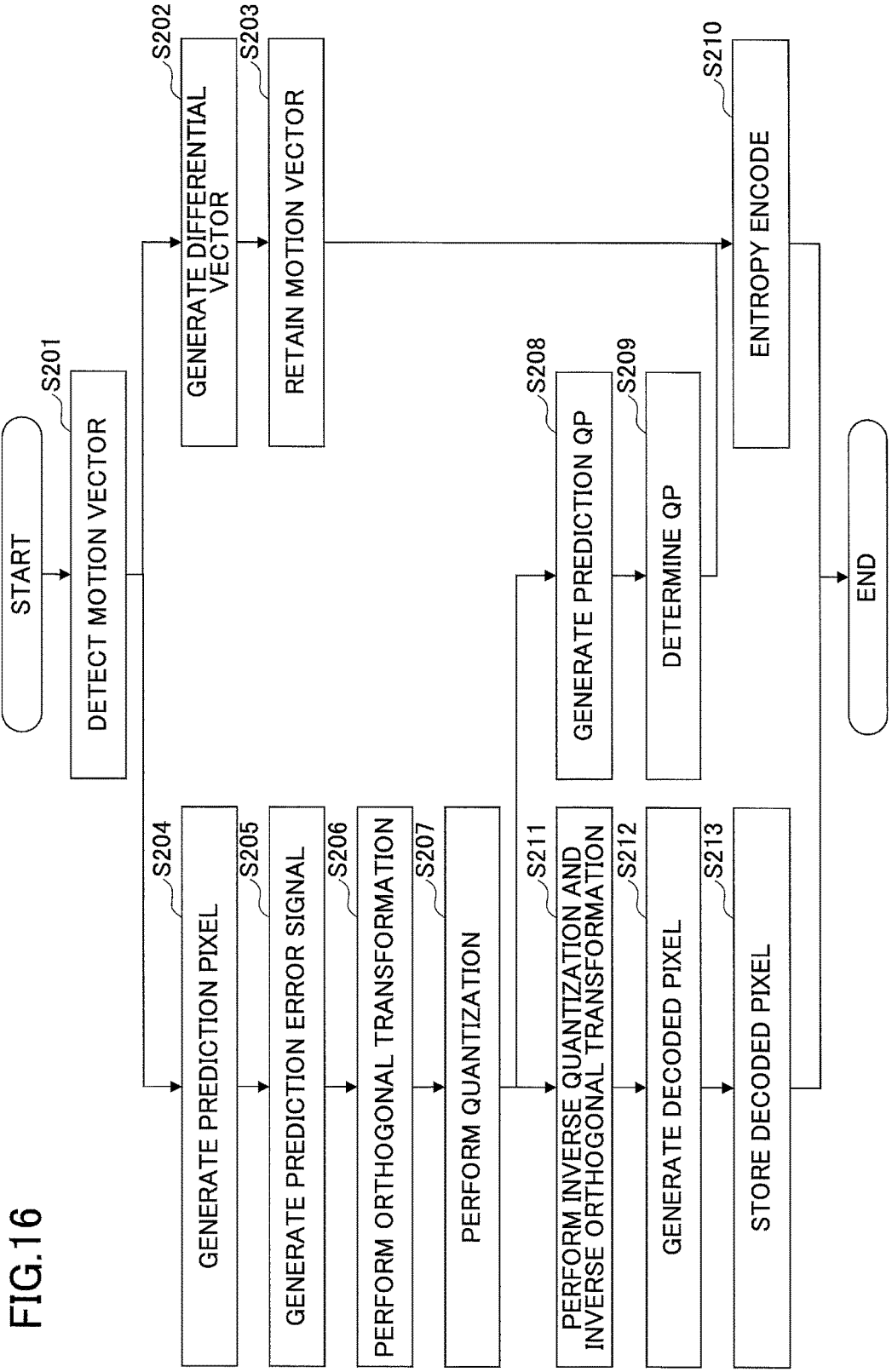
FIG. 16 is a flowchart illustrating an example of block encoding processing in the video encoder according to the second embodiment.

Next, operations of the video encoder 50 according to the second embodiment are described. FIG. 16 is a flowchart illustrating an example of block encoding processing in the second embodiment. Note that the block encoding processing illustrated in FIG. 16 corresponds to encoding processing performed on one block.

In step S201, a block subjected to processing (i.e., a processing block) is input into each of the encoding processing parts 621 to 623. The motion detecting part 708 is configured to acquire pixel data of a reference picture from the decoded pixel storage part 505 to detect a motion vector.

In step S202, the differential vector generating part 710 generates a differential vector between the detected motion vector and the generated prediction vector.

In step S203, the motion detecting part 708 stores the detected motion vector in the block information storage part 624.

In step S204, the prediction signal generating part 709 acquires regional position information of the reference image referred to by the motion vector detected by the motion detecting part 708 to generate a prediction pixel signal.

In step S205, the differential vector generating part 701 acquires the difference between the prediction pixel signal generated by the prediction signal generating part 709 and the input original pixel to generate a prediction error signal.

In step S206, the orthogonal transformation part 702 performs orthogonal transformation on the prediction error signal to generate a orthogonal transformation coefficient.

In step S207, the quantization part 703 quantizes the orthogonal transformation coefficient based on the quantization parameter (QP).

In step S208, each of the QP prediction parts 631 to 633 generates a QP prediction value of the processing block. The QP prediction value may, for example, a QP value of a block located above the processing block, or a QP value of a block processed previously by the block line encoding processing part 601 associated with the corresponding QP prediction part.

In step S209, the QP determination part 704 determines the QP value of the processing block as one of the QP value acquired from the quantization part 703 and the QP prediction value acquired from the QP prediction part. The determination method of the QP value of the processing block is already described above.

In step S210, each of the entropy encoding parts encodes the quantized orthogonal transformation coefficient, the QP differential value, and the differential vector.

In step S211, the inverse quantization part 705 and inverse orthogonal transformation part 706 respectively perform inverse quantization processing and inverse orthogonal transformation processing quantizes on the quantized orthogonal transformation coefficient to generate a signal corresponding to the prediction error signal.

In step S212, the decoded pixel generating part 707 adds the prediction pixel signal acquired from the prediction signal generating part 709 and the signal acquired from the inverse orthogonal transformation part 706 to generate a locally decoded pixel.

In step S213, the decoded pixel storage part 505 stores the generated decoded pixel. The aforementioned step is the end of the encoding processing on the block (processing block), which initiates the next encoding processing on the subsequent block.

As described above, in the video encoder according to the second embodiment, the computation of the QP prediction values may be performed in parallel, which may improve the efficiency of the parallel block line processing.

Third Embodiment

FIG. 17 is a block diagram illustrating a configuration example of a video processing device according to a third embodiment. A video processing device 90 according to the third embodiment may be one example of the video encoder or the video decoder described in the aforementioned embodiments. As illustrated in FIG. 17, the video processing device 90 includes a controller 901, a main storage part 902, an auxiliary storage part 903, a drive device 904, a network IF part 906, an input part 907, and a display part 908. The aforementioned parts are mutually connected via a bus such that data is mutually transmitted and received between these parts.

The controller 901 serves as a CPU that performs control on each of devices or performs operation or processing of data within a computer. The controller 901 also serves as an arithmetic unit capable of executing a computer program stored in the main storage part 902, so that the controller 901 receives data from the input part 907 or a storage device, performs operation or processing on the received data, and outputs the resulting data to the display part 908 or the storage device.

The main storage part 902 may be a storage device such as a read-only memory (ROM) or a random access memory (RAM) that permanently or temporarily stores programs or data such as basic software of an operating system (OS) or application software, which is executed by the controller 901.

The auxiliary storage part 903 may be a storage device such as hard disk drive (HDD), which stores data associated with the application software.

The drive device 904 is configured to retrieve the programs from a recording medium 905 such as a flexible disk or the like to install the retrieved programs in the storage device.

Further, the recording medium 905 is configured to store predetermined programs. The programs stored in the recording medium 905 are installed in the video processing device 90 via the drive device 904. Thus, the installed predetermined programs may be readily executable by the video processing device 90.

The network IF section 906 is an interface between the video processing device 90 and peripheral devices having communication functions connected via the networks such as a local area network (LAN) and a wide area network (WAN) composed of data transmission paths such as wired and/or wireless lines.

The input part 907 may include a keyboard having a cursor key, a numeric key pad, and various functional keys, a mouse or a slide pad for selecting keys displayed on a display screen of the display part 908. The input part 907 is a user interface for a user to assign operational instructions or input data to the controller 901.

The display part 908 includes a liquid crystal display (LCD) configured to display data corresponding to display data input from the controller 901. Note that the display part 908 may be externally provided, and the video processing device 90 may include a display controller in such a case.

Thus, the video encoder or video decoder illustrated in the above embodiments may be implemented as programs (e.g., video encoding program or video decoding program) executed by a computer. These programs may be installed in the computer via a server or the like so as to cause the computer to execute the programs, which may implement the aforementioned video encoder or video decoder.

Further, such video encoding program or video decoding program may be stored in the recording medium 905 so as to cause a computer or a mobile terminal to retrieve these programs stored in the recording medium 905 to implement the aforementioned video encoding processing or video decoding processing.

Note that the recording medium 905 may be various types of a recording medium such as a CD-ROM, a flexible disk and a magneto-optical disk on which information is optically, electrically or magnetically recorded; or a semiconductor memory such as a ROM or a flash memory on which information is electrically recorded. Note that the recording medium 905 includes no carrier wave.

The programs executed in the video processing device 90 may have module configurations including the respective parts illustrated in the aforementioned embodiments. In the actual hardware, the controller 901 retrieves the programs from the auxiliary storage part 903 and executes the retrieved programs. Consequently, one or more of the parts are loaded on the main storage part 902 such that the loaded parts may be generated in the main storage part 902.

Further, the video encoding processing or the video decoding processing illustrated in the above embodiments may be implemented as one or more integrated circuits.

According to the disclosed technologies, the computation of the QP prediction values may be performed in parallel, which may improve the efficiency of the parallel block line processing.

The disclosed technologies are described according to the embodiments and modification; however, the disclosed technologies are not limited to the disclosed embodiments. Various modifications or alterations may be made within the scope of the inventions described in the claims. Further, combinations of all or part of the components of aforementioned embodiments and modification may be applied.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

The invention claimed is:

1. A video decoder for decoding a stream encoded with a video encoding system, the encoded stream being obtained by encoding an image of a plurality of divided blocks, the video decoder comprising:

a parallel entropy decoding part configured to entropy decode the stream of the blocks contained in block lines, the stream of the blocks in each of the block lines being entropy decoded in parallel with the stream of the blocks in a corresponding one of the block lines, each of the block lines indicating an array of the blocks;

a parallel QP prediction part configured to compute prediction values of quantization parameters of the blocks contained in the block lines, the prediction values of the blocks in each of the block lines being computed in parallel with the prediction values of the blocks in a corresponding one of the block lines; and a parallel decoding processing part configured to generate decoded pixels with respect to the blocks contained in the block lines, the decoded pixels with respect to the blocks in each of the block lines being generated in parallel with the decoded pixels with respect to the blocks in a corresponding one of the block lines, each of the decoded pixels being decoded by utilizing data decoded by the parallel entropy decoding part and the prediction value computed by the parallel QP prediction part, wherein when the prediction value computing processing is performed on N block lines in parallel, where the N is a value of two or greater, the parallel QP prediction part performs the prediction value computing processing such that a processing block in a (K−1)th block line, which is processed in parallel with a processing block in a Kth block line, is ahead of the processing block in the Kth block line by at least one block in a horizontal position;

when the processing block in the Kth block line is at a beginning of the Kth block line, the parallel QP prediction part initializes a quantization parameter of a block processed immediately before the processing block in the Kth block line with a quantization parameter defined for a slice to which the processing block in the Kth block line belongs, and computes the prediction value of the quantization parameter of the processing block in the Kth block line based on the initialized quantization parameter;

when the processing block in the Kth block line is at a position other than the beginning of the Kth block line, the parallel QP prediction part computes the prediction value of the quantization parameter of the processing block in the Kth block line based on a quantization parameter of a block that has already been processed in the Kth block line; and the parallel decoding processing part computes the quantization parameter of the processing block in the Kth block line based on the prediction value computed by the parallel QP prediction part, and performs deblocking filter processing for the processing block in the Kth block line by using the computed quantization parameter.

2. A video decoding method executed by a video decoder, the video decoder decoding a stream encoded with a video encoding system, the encoded stream being obtained by encoding an image of a plurality of divided blocks, the video decoding method comprising:

entropy decoding the stream of the blocks contained in block lines, the stream of the blocks in each of the block lines being entropy decoded in parallel with the stream of the blocks in a corresponding one of the block lines, each of the block lines indicating an array of the blocks;

computing prediction values of quantization parameters of the blocks contained in the block lines, the prediction values of the blocks in each of the block lines being computed in parallel with the prediction values of the blocks in a corresponding one of the block lines; and generating decoded pixels with respect to the blocks contained in the block lines, the decoded pixels with respect to the blocks in each of the block lines being generated in parallel with the decoded pixels with respect to the blocks in a corresponding one of the block lines, each of the decoded pixels being decoded by utilizing data decoded in the parallel entropy decoding processing and the prediction value, wherein when the prediction value computing processing is performed on N block lines in parallel, where the N is a value of two or greater, the prediction value computing processing is performed such that a processing block in a (K−1)th block line, which is processed in parallel with a processing block in a Kth block line, is ahead of the processing block in the Kth block line by at least one block in a horizontal position;

when the processing block in the Kth block line is at a beginning of the Kth block line, a quantization parameter of a block processed immediately before the processing block in the Kth block line is initialized with a quantization parameter defined for a slice to which the processing block in the Kth block line belongs, and the prediction value of the quantization parameter of the processing block in the Kth block line is computed based on the initialized quantization parameter;

when the processing block in the Kth block line is at a position other than the beginning of the Kth block line, the prediction value of the quantization parameter of the processing block in the Kth block line is computed based on a quantization parameter of a block that has already been processed in the Kth block line; and the quantization parameter of the processing block in the Kth block line is computed based on the computed prediction value, and deblocking filter processing is performed for the processing block in the Kth block line by using the computed quantization parameter.

3. A recording medium storing a video decoding program executed by a video decoder, the video decoder decoding a stream encoded with a video encoding system, the encoded stream being obtained by encoding an image of a plurality of divided blocks, the video decoding program, when executed by the video decoder, implementing a procedure comprising:

entropy decoding, by a processor, the stream of the blocks contained in block lines, the stream of the blocks in each of the block lines being entropy decoded in parallel with the stream of the blocks in a corresponding one of the block lines, each of the block lines indicating an array of the blocks;

computing prediction values of quantization parameters of the blocks contained in the block lines, the prediction values of the blocks in each of the block lines being computed in parallel with the prediction values of the blocks in a corresponding one of the block lines; and generating decoded pixels with respect to the blocks contained in the block lines, the decoded pixels with respect to the blocks in each of the block lines being generated in parallel with the decoded pixels with respect to the blocks in a corresponding one of the block lines, each of the decoded pixels being decoded by utilizing data decoded in the parallel entropy decoding processing and the prediction value, wherein when the prediction value computing processing is performed on N block lines in parallel, where the N is a value of two or greater, the prediction value computing processing is performed such that a processing block in a (K−1)th block line, which is processed in parallel with a processing block in a Kth block line, is ahead of the processing block in the Kth block line by at least one block in a horizontal position;

when the processing block in the Kth block line is at a beginning of the Kth block line, a quantization parameter of a block processed immediately before the processing block in the Kth block line is initialized with a quantization parameter defined for a slice to which the processing block in the Kth block line belongs, and the prediction value of the quantization parameter of the processing block in the Kth block line is computed based on the initialized quantization parameter;

when the processing block in the Kth block line is at a position other than the beginning of the Kth block line, the prediction value of the quantization parameter of the processing block in the Kth block line is computed based on a quantization parameter of a block that has already been processed in the Kth block line; and the quantization parameter of the processing block in the Kth block line is computed based on the computed prediction value, and deblocking filter processing is performed for the processing block in the Kth block line by using the computed quantization parameter.

* * * * *